United States Patent
Burns et al.

[11] Patent Number: 5,780,742
[45] Date of Patent: Jul. 14, 1998

[54] MECHANICAL RESONANCE, SILICON ACCELEROMETER

[75] Inventors: David W. Burns, Minneapolis, Minn.; Richard H. Frische, Phoenix, Ariz.

[73] Assignee: Honeywell Inc., Minneapolis, Minn.

[21] Appl. No.: 799,587

[22] Filed: Feb. 10, 1997

Related U.S. Application Data

[63] Continuation of Ser. No. 403,560, Mar. 13, 1995, abandoned, which is a continuation-in-part of Ser. No. 198,332, Feb. 18, 1994, abandoned, which is a division of Ser. No. 48,096, Apr. 15, 1993, Pat. No. 5,396,798.

[51] Int. Cl.$^6$ .................................................. G01P 15/08
[52] U.S. Cl. .................. 73/514.29; 73/514.18; 73/514.38
[58] Field of Search .............. 73/514.29, 514.15, 73/514.32, 514.18, 514.34, 514.38, 862.59

[56] References Cited

U.S. PATENT DOCUMENTS

| Re. 31,459 | 12/1983 | Block | 338/47 |
|---|---|---|---|
| 3,453,457 | 7/1969 | Hayer et al. | 73/522 |
| 4,553,436 | 11/1985 | Hansson | 73/517 R |
| 4,597,003 | 6/1986 | Aine et al. | 357/26 |
| 4,600,934 | 7/1986 | Aine et al. | 357/26 |
| 4,744,863 | 5/1988 | Guckel et al. | 156/653 |
| 4,783,237 | 11/1988 | Aine et al. | 437/15 |
| 4,829,822 | 5/1989 | Imai et al. | 73/517 R |
| 4,851,080 | 7/1989 | Howe et al. | 73/517 AV |
| 4,853,669 | 8/1989 | Guckel et al. | 338/4 |
| 4,882,933 | 11/1989 | Petersen et al. | 73/517 R |
| 4,897,360 | 1/1990 | Guckel et al. | 437/247 |
| 4,901,570 | 2/1990 | Chang et al. | 73/517 AV |
| 4,928,203 | 5/1990 | Swindal et al. | 73/517 AV |
| 4,930,042 | 5/1990 | Wiegand et al. | 73/517 R |
| 4,945,765 | 8/1990 | Roszhart | 73/514.29 |
| 4,996,082 | 2/1991 | Guckel et al. | 427/99 |
| 5,006,487 | 4/1991 | Stokes | 73/517 AV |
| 5,013,693 | 5/1991 | Guckel et al. | 437/248 |
| 5,090,254 | 2/1992 | Guckel et al. | 73/654 |
| 5,101,664 | 4/1992 | Hockaday et al. | 73/704 |
| 5,121,180 | 6/1992 | Beringhause et al. | 73/517 R |
| 5,165,289 | 11/1992 | Tilmans | 73/862.59 |
| 5,251,485 | 10/1993 | Kondo | 73/517 R |
| 5,261,277 | 11/1993 | Thomas et al. | 73/514.15 |
| 5,396,798 | 3/1995 | Frische | 73/514.15 |

FOREIGN PATENT DOCUMENTS

| 0363003A2 | 4/1990 | European Pat. Off. . |
|---|---|---|
| 0386463A2 | 9/1990 | European Pat. Off. . |
| 0451992A2 | 10/1991 | European Pat. Off. . |
| 4208043A1 | 9/1993 | Germany . |

*Primary Examiner*—Christine K. Oda
*Attorney, Agent, or Firm*—John G. Shudy, Jr.

[57] ABSTRACT

A silicon accelerometer includes a plurality of silicon layers. The silicon layers form first and second silicon beams supported by flexure members. An acceleration responsive silicon mass is arranged to bend the flexure members in response to accelerations. The silicon beams are vibrated in vacuum chambers and gas damping is provided for the acceleration responsive mass and the flexure members. A sensor is provided for sensing vibration of the first and second silicon beams.

28 Claims, 13 Drawing Sheets

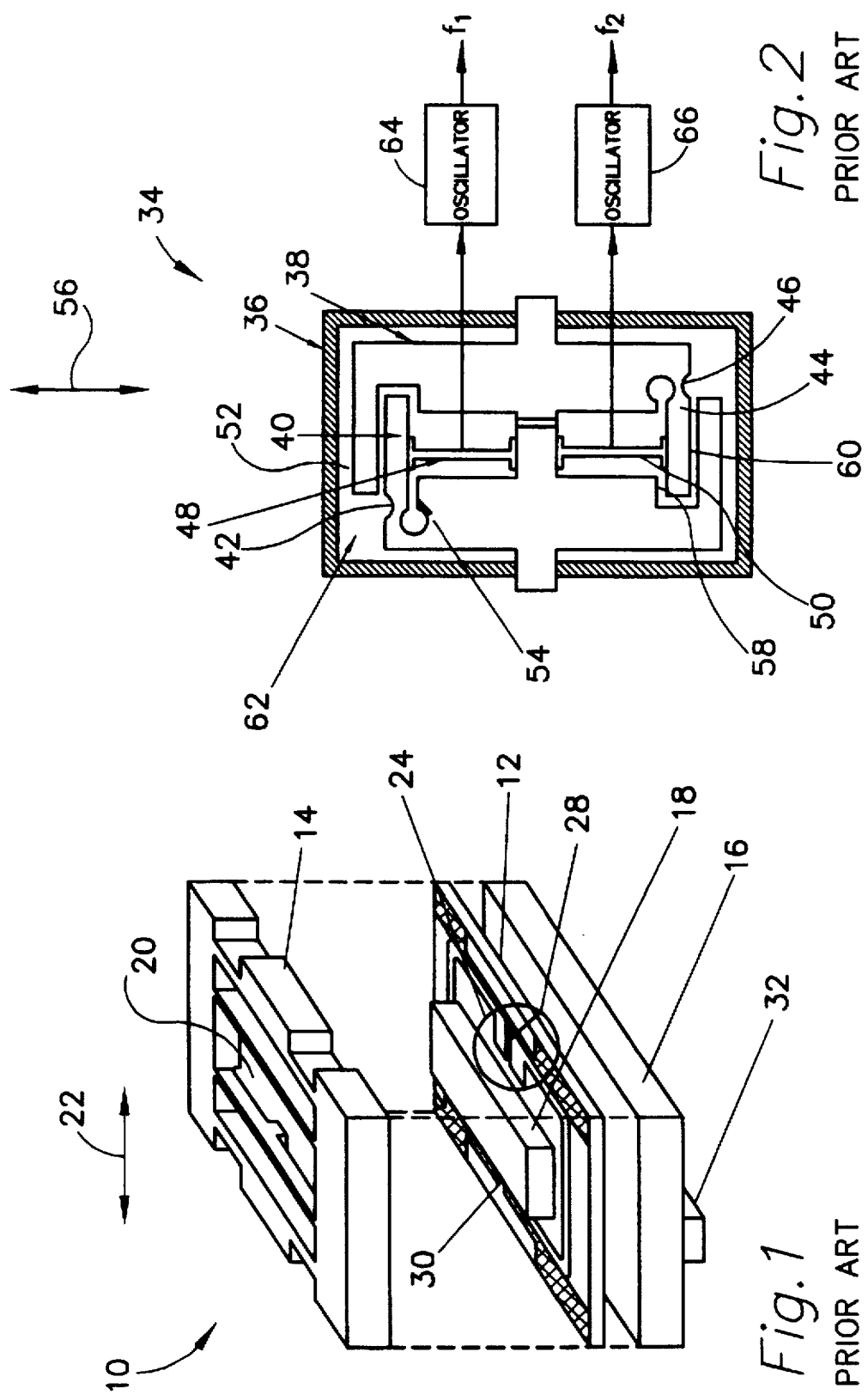

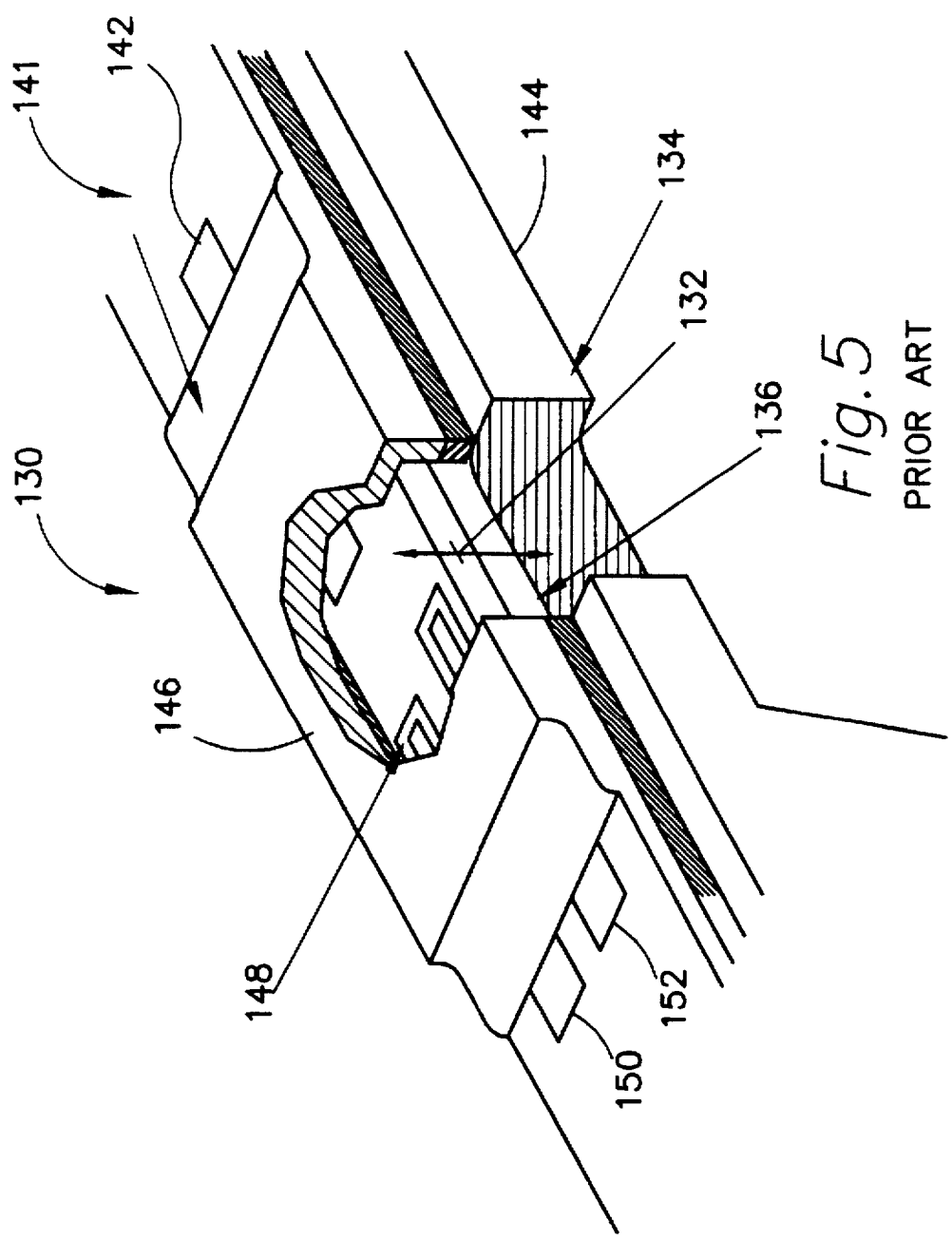
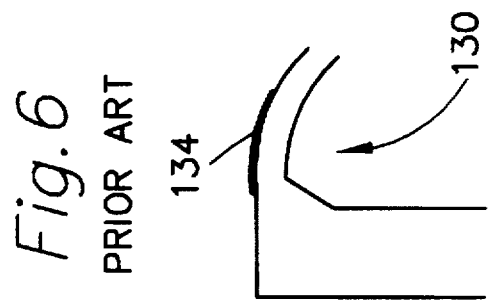
Fig. 5 PRIOR ART
Fig. 6 PRIOR ART

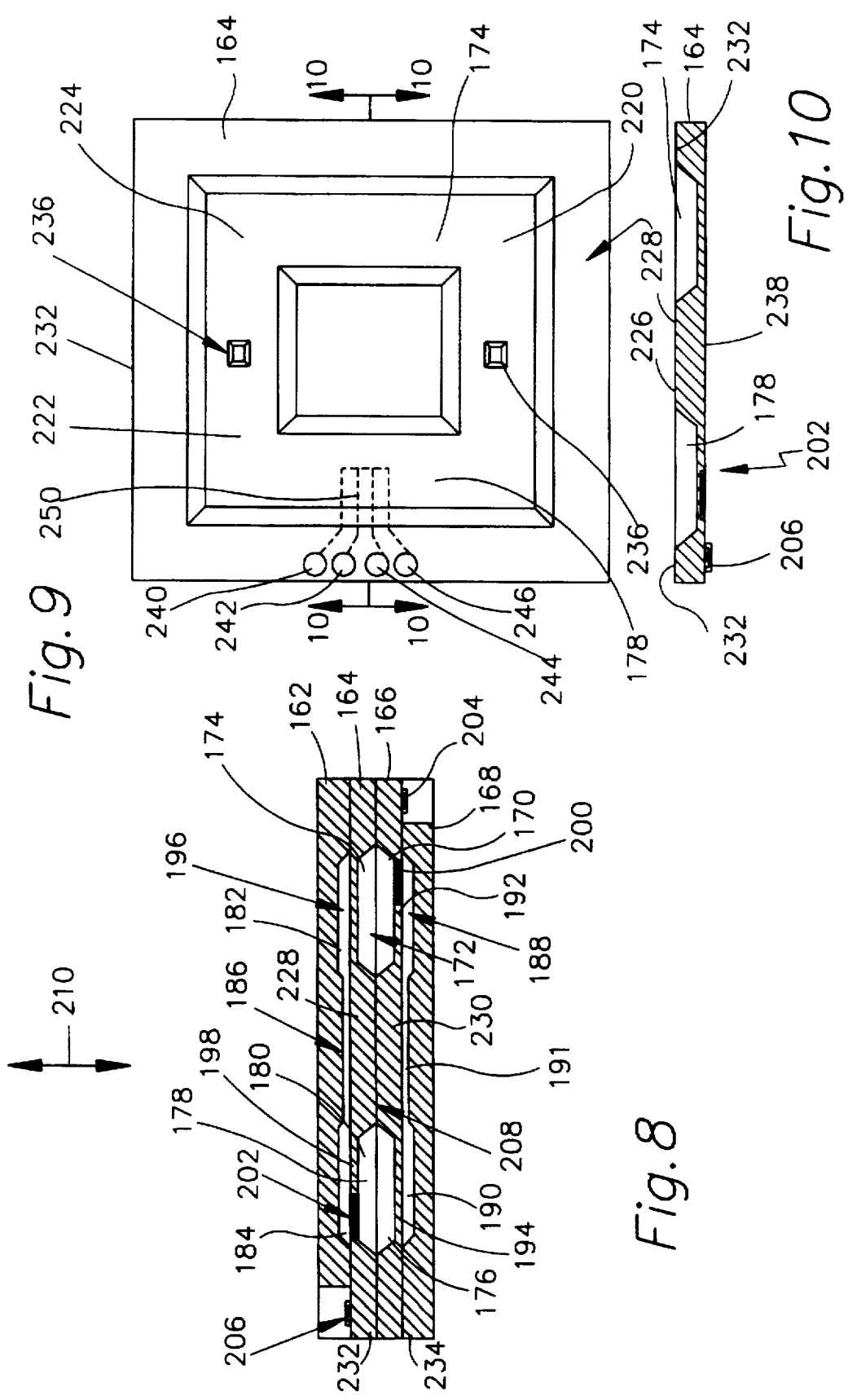

MECHANICAL RESONANCE, SILICON ACCELEROMETER

This application is a continuation of application Ser. No. 08/403,560, filed Mar. 13, 1995 now abandoned which is a continuation-in-part of application Ser. No. 08/198,332, filed Feb. 18, 1994, now abandoned, which is a divisional of Ser. No. 08/048,096, filed Apr. 15, 1993, now U.S. Pat. No. 5,396,798, issued Mar. 14, 1995.

TECHNICAL FIELD OF THE INVENTION

The present invention relates to accelerometers and, more particularly, to vibrating silicon beam sensors arranged to sense acceleration.

BACKGROUND OF THE INVENTION

An accelerometer is a device which senses acceleration, as well as shocks and vibrations, along or about an input or sensitive axis. One type of such an accelerometer is a mechanical resonating accelerometer which senses linear accelerations parallel to; or along, an input axis. If acceleration is to be sensed three-dimensionally, a triad of such accelerometers is arranged such that a first accelerometer senses acceleration along the x coordinate axis, a second accelerometer senses acceleration along the y coordinate axis, and a third accelerometer senses acceleration along the z coordinate axis.

A linear accelerometer typically includes a damped seismic mass which is positionally constrained by spring forces. In response to an acceleration, the seismic mass moves relative to its support and, when the acceleration ends, the seismic mass is returned to its initial position by the spring forces. The displacement of the seismic mass due to acceleration is converted into an electrical output by various types of transducers in order to produce a measure of the acceleration.

For example, in a potentiometric accelerometer, the transducer is a potentiometer having a resistance held in a fixed position with respect to a support surface. A wiper arm of the potentiometer is driven by a mechanical linkage connected between a seismic mass and the wiper arm. As the seismic mass moves in response to accelerations, the mechanical linkage moves the wiper arm over the resistance of the potentiometer to change the electrical output from the potentiometer. This change in electrical output provides an indication of the amount and direction of acceleration.

An inductive type accelerometer typically uses an inductance bridge sensitive to the motion of a seismic mass. As the seismic mass moves in response to accelerations, the seismic mass drives a ferromagnetic armature with respect to two inductive coils resulting in an increase of the inductance of one inductive coil and a decrease of the inductance of the other inductive coil. The difference in inductances between the two inductive coils provides an indication of the amount and direction of acceleration.

A strain gauge accelerometer includes a seismic mass attached to a strain gage which may be fabricated out of metal wire, metal foil or semiconductors. Servo accelerometers and piezoelectric accelerometers are also known. In piezoelectric accelerometers, a seismic mass is mechanically connected to a crystal material which may be comprised of quartz or of such ceramic mixtures as titanate, niobate, or zirconate.

A typical prior art mechanical resonating linear accelerometer generally utilizes at least one, and more often two, quartz beams and is a rather complex mechanical assembly. In such a quartz beam linear accelerometer, a quartz beam is caused to vibrate at a base frequency. The quartz beam converts its mechanical vibration into an electrical signal having a frequency which tracks the frequency of the mechanical vibration. In the presence of acceleration, the vibration frequency of the quartz beam changes and this change in vibration frequency provides an indication of the amount and direction of acceleration experienced by the quartz beam accelerometer.

If the quartz beam linear accelerometer employs two quartz beams, the two quartz beams are generally arranged so that, in the presence of an acceleration along an input (i.e. sensitive) axis, one of the quartz beams experiences an increase in vibration frequency and the other quartz beam experiences a decrease in vibration frequency. The difference between these vibration frequencies of the two quartz beams provides an indication of the amount and direction of acceleration along the input axis. Quartz beams which are arranged in this push/pull manner benefit from common mode rejection wherein changes in vibration frequency of one quartz beam in response to such environmental factors as temperature and pressure are negated by equal changes in vibration frequency of the other quartz beam.

Quartz beam accelerometers have several disadvantages. For example, in assembling a quartz beam accelerometer, the quartz beams are typically bonded or glued between a support and a seismic mass thereby creating undesirable stresses and other problems resulting from thermal expansions. These stresses and problems adversely affect the performance of the accelerometer. Moreover, quartz beams normally have a high Q when operating in a vacuum. However, when used in an accelerometer, such quartz beams often are required to operate in a chamber where a level of gas pressure is usually maintained for the purpose of gas damping the seismic mass suspension structure. Unfortunately, this gas pressure also damps the resonating quartz beams which thereby decreases the Q, and, therefore, the stability, of the vibrating quartz frequency. (The quantity Q as used herein is a quality factor relating to the stability of a vibrating device; that is, Q is generally defined as one-half of the kinetic and potential energy stored in a vibrating beam divided by the energy lost by a vibrating beam per vibration cycle. If the energy applied by a force to the vibrating beam at a given point in time is equal to the total energy (i.e. the sum of the kinetic and potential energies of the beam) stored in the beam at that point in time, the vibrating beam has no loss; however, any difference between this applied energy and the total energy of the vibrating beam is the energy lost by the vibrating beam. Furthermore, in response to acceleration, the frequency of the quartz beam can change by only approximately 10% of its base frequency through its useful range, i.e. a quartz beam having a base frequency of 40,000 Hz., for example, is limited to a 4,000 Hz. variation in response to acceleration.

SUMMARY OF THE INVENTION

The resonating silicon beam accelerometer of the present invention allows silicon processing techniques to be employed in fabricating the silicon beam accelerometer and thus avoids many of the disadvantages and complexities of prior art quartz and silicon beam accelerometers. The resonating silicon beam accelerometer may be constructed using cost effective photolithographic techniques common to the silicon industry and results in an essentially monolithic structure. Thus, there are no glued or bonded joints which create stresses on the vibrating silicon sensing beams due to thermal expansion. The construction of the resonating silicon beam accelerometer of the present invention permits gas damping of the seismic mass suspension structure of the accelerometer while at the same time permitting the silicon beam to vibrate in a vacuum chamber such that there is no interference between the use of a damping gas for the seismic mass suspension system and the Q of the vibrating silicon beam. Accordingly, the Q of the vibrating silicon beam can be maintained at a high level. Furthermore, the vibration frequency of the silicon beam of the resonating silicon beam accelerometer of the present invention can vary by over 300% of its base frequency in response to acceleration.

An accelerometer according to one aspect of the present invention includes first, second, third, and fourth silicon layers wherein each of the silicon layers has first and second surfaces. The second surface of the second silicon layer and the first surface of the third silicon layer are recessed to form first and second cavities and an acceleration responsive mass between the first and second cavities. The first and second cavities define (a) first and second silicon flexure members in the first surface of the second silicon layer, respectively and (b) third and fourth silicon flexure members in the second surface of the third silicon layer respectively. The first silicon layer has first and second recesses in the second surface thereof, the first recess being arranged so that the first flexure member separates the first cavity and the first recess, and the second recess being arranged so that the second flexure member separates the second cavity and the second recess. The fourth silicon layer has third and fourth recesses in the first surface thereof, the third recess being arranged so that the third flexure member separates the first cavity and the third recess, and the fourth recess being arranged so that the fourth flexure member separates the second cavity and the fourth recess. A first means senses bending of the first flexure member, and a second means senses bending of the fourth flexure member.

An accelerometer according to another aspect of the invention includes first, second, third, and fourth silicon layers wherein each of the silicon layers has first and second surfaces. The second surface of the second silicon layer and the first surface of the third silicon layer are recessed to form a first continuous cavity surrounding an acceleration responsive mass. The first continuous cavity forms a first flexure member in the first surface of the second silicon layer and a second flexure member in the second surface of the third silicon layer. The acceleration responsive mass is arranged to bend the first and second flexure members in response to acceleration. The first silicon layer has a second continuous cavity in the second surface thereof. The second continuous cavity is arranged so that the first flexure member separates the first and second continuous cavities. The fourth silicon layer has a third continuous cavity in the first surface thereof. The third continuous cavity is arranged so that the second flexure member separates the first and third continuous cavities. First and second sensing means sense bending of the first and second flexure members respectively, and the first and second sensing means are arranged with respect to one another for achieving common mode rejection.

An accelerometer according to a further aspect of the invention includes a first vibrating beam supported by a first flexure member, and a second vibrating beam supported by a second flexure member. An acceleration responsive mass is arranged to bend the first and second flexure members in at least first and second directions in response to accelerations. A damping means damps the first and second flexure members and the acceleration responsive mass. The damping means includes a gas. Vacuum chambers are provided within which the first and second vibrating beams vibrate. The vacuum chambers are isolated from the gas. First and second sensing means sense vibration of the first and second vibrating beams, respectively.

A silicon accelerometer according to a still further aspect of the invention includes a first silicon vibrating beam supported by a first silicon flexure member, and a second silicon vibrating beam supported by a second silicon flexure member. An acceleration responsive silicon mass is arranged to bend the first and second silicon flexure members in at least first and second directions in response to accelerations. A damping means surrounds the first and second silicon flexure members and the acceleration responsive mass in order to damp the acceleration responsive silicon mass. The damping means includes a gas. Vacuum chambers are provided within which the first and second silicon vibrating beams vibrate, the vacuum chambers being isolated from the gas. Sensing means sense vibration of the first and second silicon vibrating beams, respectively.

BRIEF DESCRIPTION OF THE DRAWING

These and other features and advantages will become more apparent from a detailed consideration of the invention when taken in conjunction with the drawing in which:

FIG. 1 shows a prior art push-pull quartz beam accelerometer;

FIG. 2 shows another prior art push-pull quartz beam accelerometer;

FIGS. 5, 6 and 7 show a known silicon sensor which forms the basis of the accelerometer according to the present invention;

FIG. 8 is a cross-sectional side view of an accelerometer according to the present invention;

FIG. 9 is a top view of one of the mass/suspension/beam (m/s/b) layers of the accelerometer shown in FIG. 8;

FIG. 10 is a cross-sectional side view taken along lines 10—10 of FIG. 9;

DETAILED DESCRIPTION

Figure 4:
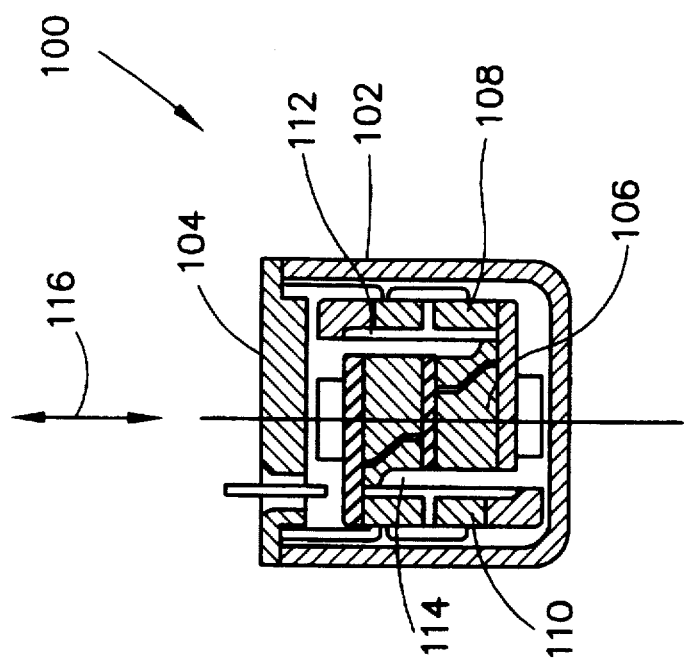
FIG. 4 shows another prior art accelerometer.

A prior art push-pull quartz beam accelerometer 10 is shown in FIG. 1 and includes an active plate 12 supported between a top support plate 14 and a lower support plate 16. Located on the active plate 12 is a seismic mass 18. The upper support plate 14 has a central opening 20 in order to receive the seismic mass 18. The top support plate 14 is arranged to limit the travel of the seismic mass 18 along the input (i.e. sensitive) axis depicted by a directional arrow 22. The active plate 12 is formed of a quartz material having a first opening 24 and a second opening 26 defining a first quartz beam 28 therebetween. Similar openings on an opposite side of the active plate 12 define a second quartz beam 30. A mounting bar 32 is included in association with the lower support plate 16 in order to mount the quartz beam accelerometer 10 to a platform.

The quartz beams 28 and 30 are driven (by a driver not shown) into vibration at a predetermined frequency. As acceleration is experienced by the quartz beam accelerometer 10, the seismic mass 18 responds to this acceleration by pushing one of the quartz beams 28 and 30 into compression and pulling the other of the quartz beams 28 and 30 into tension. The vibration frequencies of the quartz beams 28 and 30 thus change oppositely to one another and this differential change in vibration frequency is sensed in order to provide an indication of the amount of acceleration experienced by the push-pull quartz beam accelerometer 10.

Shown in FIG. 2 is another prior art dual vibrating quartz beam accelerometer 34. The dual vibrating quartz beam accelerometer 34 includes a housing 36 which supports a vibrating beam support assembly 38. A first pendulum 40 is suspended by the support assembly 38 by way of a hinge 42 and a second pendulum 44 is suspended by the beam support assembly 38 by way of a hinge 46. A first vibrating quartz beam 48 is suitably attached between the pendulum 40 and the beam support assembly 38 and a second vibrating quartz beam 50 is suitably attached between the second pendulum 44 and the beam support assembly 38. The beam support assembly 38 is configured to provide gaps 52 and 54 between the first pendulum 40 and the beam support 38 in order to limit travel of the pendulum 40 in either direction of the input axis of the accelerometer 34 depicted by a directional arrow 56. By the same token, the support assembly 38 is configured to provide gaps 58 and 60 between the second pendulum 44 and the beam support 38 in order to limit the travel of the pendulum 44 in either direction along the input axis depicted by the directional arrow 56. The beam support assembly 38 also provides gas film damping surfaces that cooperate with the surfaces of the pendulums to damp the pendulums 40 and 44.

The quartz beams 48 and 50 are driven into vibration at a base frequency. As the accelerometer 34 experiences acceleration along its input axis depicted by the directional arrow 56, one of the quartz beams 48 and 50 is pushed into compression by its corresponding pendulum, and the other of the quartz beams 48 and 50 is pulled into tension by its corresponding pendulum. For example, if the accelerometer 34 is accelerated in the upward direction as viewed in FIG. 2, the pendulums 40 and 44 tend to rotate downward with respect to the beam support 38. This rotation of the pendulums 40 and 44 pushes the quartz beam 48 into compression and pulls the quartz beam 50 into tension. The resulting change in the forces acting on the quartz beams 48 and 50 differentially alters the vibration frequencies of the quartz beams 48 and 50. That is, as in the case of the accelerometer 10 shown in FIG. 1, the vibration frequency of the quartz beam 48 decreases and the vibration frequency of the quartz beam 50 increases. This differential frequency change is sensed by oscillators 64 and 66 in order to provide an indication of the amount of acceleration experienced by the accelerometer 34.

Figure 3:
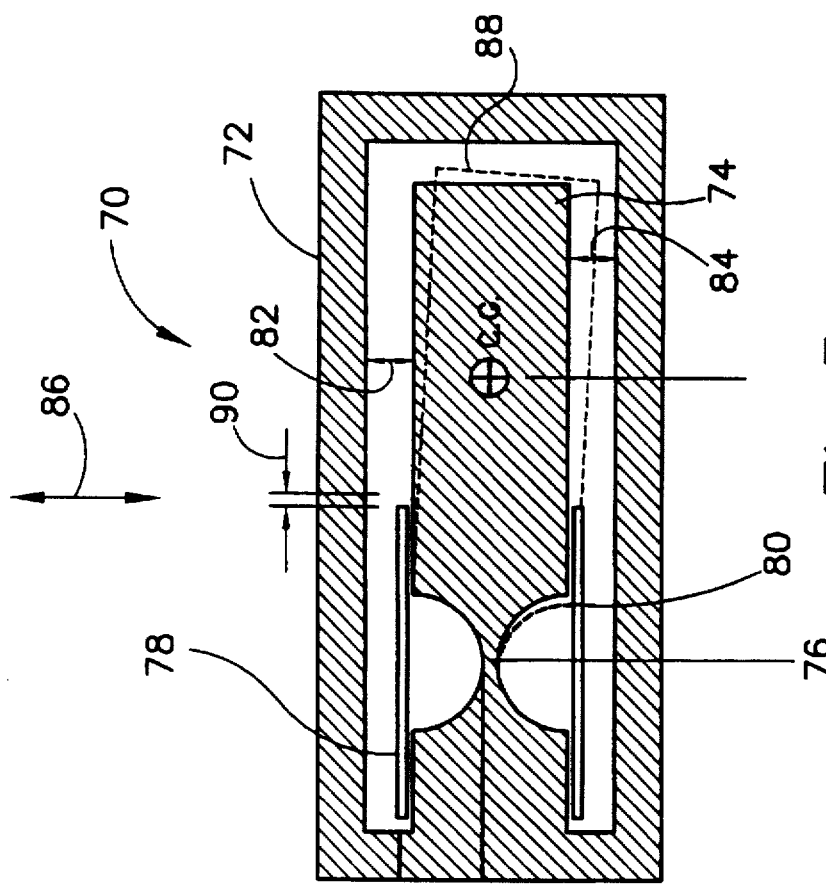
FIG. 3 shows a prior art double ended quartz beam tuning fork accelerometer.

FIG. 3 illustrates a prior art double-ended tuning fork quartz beam accelerometer 70. The accelerometer 70 includes a housing 72 containing a seismic mass 74 attached to the housing 72 by a hinge 76. A first quartz beam 78 spans the hinge area 76, on one side of the seismic mass 74, from the housing 72 to the seismic mass 74. A second quartz beam 80 similarly spans the hinge area 76, on the opposite side of the seismic mass 74, from the housing 72 to the seismic mass 74. The housing 72 and the seismic mass 74 are configured to provide a pair of gaps 82 and 84 between the seismic mass 74 and the housing 72. These gaps act as shock caging gaps in order to limit travel of the seismic mass 74 resulting from accelerations along the input axis of the accelerometer 70 depicted by a directional arrow 86. The housing 72 also provides gas film damping surfaces that cooperate with the surfaces of the seismic mass to damp the seismic 74.

The quartz beams 78 and 80 are typically driven at a base vibration frequency by a source of electrical energy. As the seismic mass 74 pivots about the hinge 72 in response to an acceleration along the input axis depicted by the directional arrow 82, the seismic mass 74 pivots about the hinge 76 which causes the seismic mass 74 to assume the position shown by the dotted line 88 in FIG. 3. If the movement of the seismic mass 74 is downward as shown in FIG. 3, the quartz beam 78 is stretched by an amount 90, and the quartz beam 80 is compressed by a similar amount. As the seismic mass 74 so pivots in either direction along its input axis, the seismic mass 74 pushes one of the quartz beams 78 and 80 into compression and pulls the other of the quartz beams 78 and 80 into tension. This change in the tension and compression of the quartz beams 78 and 80 results in a differential change of the vibration frequencies of the quartz beams 78 and 80. This differential change of the vibration frequencies of the quartz beams 78 and 80 provides an indication of the amount of the acceleration.

As shown in FIG. 4, another prior art accelerometer 100 includes a housing 102 and a cover 104. Within the housing 102 is a seismic mass 106 suspended by seismic mass supports 108 and 110. A first quartz beam 112 is attached at one end to the seismic mass support 108 and at the other end to the seismic mass 106. A second quartz beam 114 is attached at one end to the seismic mass support 110 and at the other end to the seismic mass 106. As the accelerometer 100 experiences accelerations along its input axis depicted by a directional arrow 116, the seismic mass 106 moves to push one of the quartz beams 112 and 114 into compression and pull the other of the quartz beams 112 and 114 into tension.

The quartz beams 112 and 114 may be electrically vibrated at a base frequency. As the accelerometer 100 experiences acceleration, the seismic mass 106 moves to push one of the quartz beams 112 and 114 into compression and to pull the other of the quartz beams 112 and 114 into tension which results in a differential change in the vibration frequencies of the quartz beams 112 and 114. This differential vibration frequency change provides an indication of the amount of acceleration experienced by the accelerometer 100.

Such prior art accelerometers employ either stiffened flexure members to support the seismic mass or a damping gas in order to avoid undesirable sensitivities to vibration. If stiffened flexure members are employed, the sensitivity of the accelerometer is traded off against the desired lower frequency response of the accelerometer. If a damping gas is used, the internal volume of the accelerometer housing is filled with a damping gas at a pressure which is selected to provide the proper amount of damping for the seismic mass or the pendulum of the accelerometer. As discussed above, this gas has the unfortunate result that, not only is the seismic mass or pendulum damped, but the vibrating quartz beams are also damped. Damping of the vibrating quartz beams decreases the Q of the accelerometer. A decrease in Q reduces the frequency stability of the vibrating quartz beams.

Furthermore, the accelerometers of FIGS. 1–4 are mechanically complex assemblies which are costly to manufacture and to assemble. The quartz beams included in these assemblies are typically bonded or glued into place which creates undesirable stresses and thermal expansion problems. Furthermore, a quartz beam, because it typically has a low tensile strength, has a limited range within which its vibration frequency can change. For example, a quartz beam having a base vibration frequency of 40,000 hertz is limited to a range of 4,000 hertz centered about its base frequency. A vibrating quartz beam will break if it is vibrated at a frequency above the upper frequency of this frequency range.

On the other hand, a silicon beam has a higher tensile strength and, therefore, can undergo a greater range of vibration frequency variation. Thus, a silicon beam can experience frequency variations on the order of 300% of the base frequency. When a vibrating silicon beam is used in an accelerometer, this greater range produces better resolution of the output signal which provides the indication of acceleration. A further advantage of using silicon vibrating beams is that the silicon accelerometer can be fabricating using cost effective photolithographic techniques common to the silicon industry.

Figure 7:
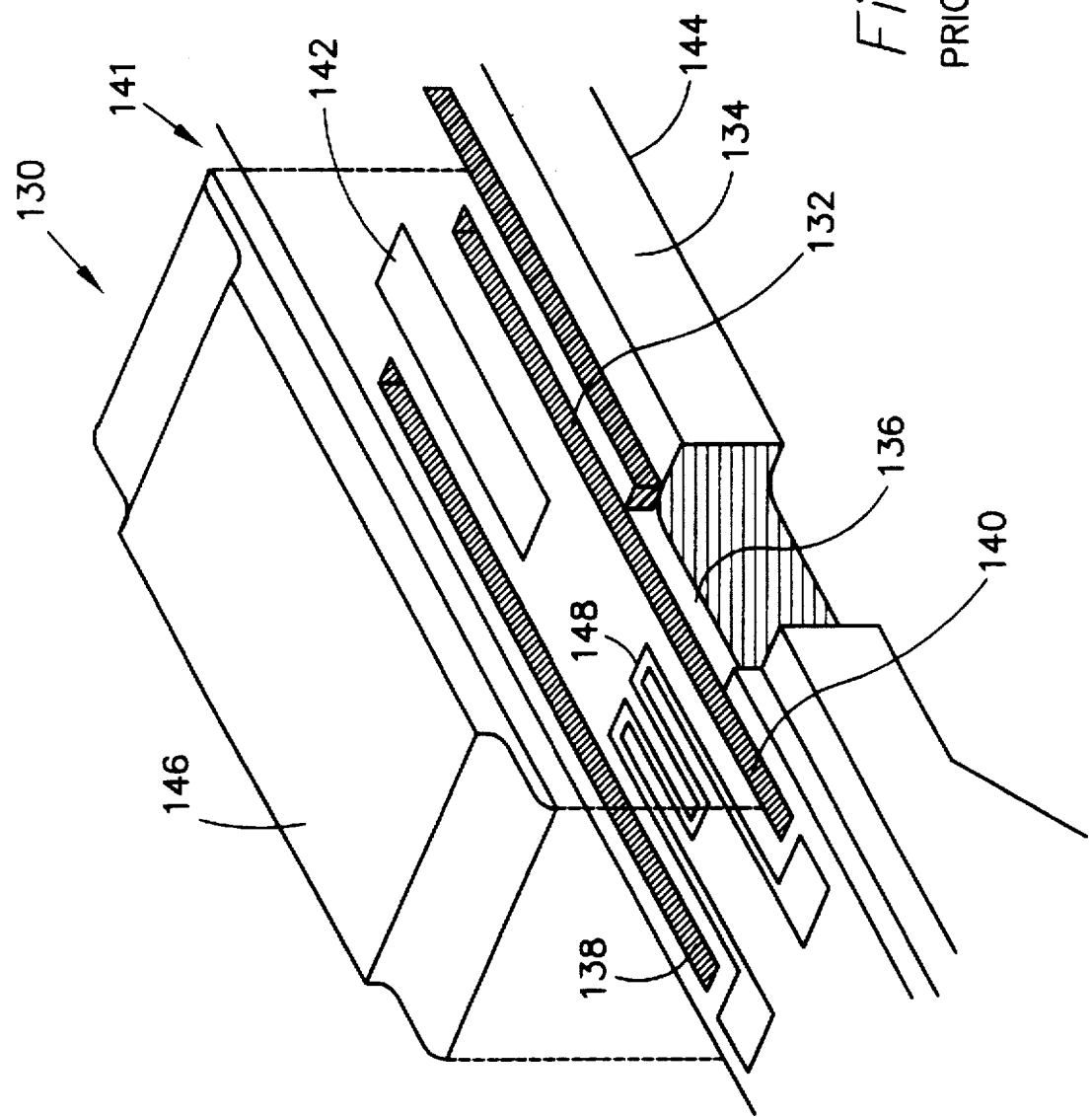

A silicon sensor 130, which may be used in the accelerometer of the present invention, is shown in FIGS. 5, 6 and 7. The silicon sensor 130 may be made by one or more of the processes shown in the following U.S. Patents: U.S. Pat. Nos. 4,744,863; 4,853,669; 4,897,360; 4,996,082; 5,013,693; and, 5,090,254. The silicon sensor 130 includes a thin silicon beam 132 of polysilicon material which may be deposited on a semiconducting crystalline silicon flexure member 134. The thickness of the silicon beam 132 may be on the order of two micrometers, for example. A vacuum chamber 136 is formed partially beneath the silicon beam 132. The vacuum chamber 136, together with a pair of slots 138 and 140, permits the silicon beam 132 to vibrate with a very high Q.

A drive capacitor 141 can be used to vibrate the silicon beam 132 at a base frequency. The drive capacitor 141 can be either a two electrode capacitor or, preferably, a three electrode capacitor. Only one capacitor electrode 142 of the drive capacitor 141 is shown in FIGS. 5 and 7. The electrode 142 may be a metal film suitably adhered to one of the surfaces of the silicon beam 132 or, preferably, the electrode 142 may be a doped region on the surface of the silicon beam 132. A second electrode (not shown) of the drive capacitor 141 can be similarly doped into the flexure member 134. A cover 146 is placed over at least a portion of the silicon beam 132 to complete the vacuum chamber 136 within which the silicon beam 132 vibrates. The cover 146 should have an interior recess of sufficient depth to permit the silicon beam 132 to vibrate in response to the drive capacitor 141. A third electrode (not shown) can be supported by the cover 146. For example, if the cover 146 is a silicon cover, the third electrode may be doped into a surface of the cover 146 which faces the silicon beam 132. Finally, the silicon sensor 130 also includes a sensing piezoelectric resistor 148 which senses the vibration of the silicon beam 132 and which may be doped into the same surface of the silicon beam 132 into which the electrode 142 is doped. The piezoelectric resistor 148 has terminals 150 and 152.

In using the silicon sensor 130 in the accelerometer of the present invention, an alternating current may be supplied to the drive capacitor 141 in order to vibrate the silicon beam 132. If the drive capacitor 141 is a two electrode capacitor, an alternating current energizes the two electrodes of the drive capacitor 141 to produce an alternating electrostatic field in order to vibrate the silicon beam 132 at the frequency of the alternating current. If the drive capacitor 141 is a three electrode capacitor, an alternating current is applied across the upper capacitor electrode on the cover 146 and the lower capacitor electrode on the flexure member 134 so that an alternating electrostatic field exerts an alternating force on the silicon beam 132 to vibrate the silicon beam 132 at the frequency of the alternating current. The middle electrode 142 is connected to circuit ground.

The inputs of an oscillator amplifier (not shown in FIGS. 5–7) can be connected to the piezoelectric resistor 148 by way of the terminals 150 and 152, and the outputs of this oscillator amplifier can be connected to the electrodes of the drive capacitor 141 which vibrates the silicon beam 132. The resonant frequency at which the silicon beam 132 vibrates is determined by the strain on the silicon beam 132. Accordingly, the resistance value of the piezoelectric resistor 148 changes with changes in the resonant frequency of the silicon beam 132. Thus, the piezoelectric resistor 148 provides a signal to the oscillator amplifier wherein the frequency of this signal is the resonant frequency of the silicon beam 132. The amplifier provides an output to the capacitor 141 wherein the frequency of the output from the amplifier is the resonant frequency of the silicon beam 132. The drive capacitor 141 provides sufficient energy to sustain the vibration of the silicon beam 132.

Thus, the silicon sensor 130 can be used to sense forces which result in bending of the flexure member 134. That is, as a force causes the flexure member 134 to bend as shown in FIG. 6 so that the silicon beam 132 of the silicon sensor 130 lies on the outside surface of the curvature of the flexure member 134, the silicon beam 132 experiences an increase in tension causing its resonant frequency to increase. Likewise, as a force causes the flexure member 134 to bend so that the silicon beam 132 lies on the inside surface of the curvature of the flexure member 134, the silicon beam 132 experiences an increase in compression causing its resonant frequency to decrease.

The change in output frequency of the oscillator amplifier can be sensed as an indication of the amount, and the direction, of forces which are applied to the flexure member 134. Typical silicon beams formed on silicon flexures may have an unstressed base resonant frequency of from 500,000 hertz to 600,000 hertz. Under tension, this frequency swings as high as 2,000,000 hertz, and under compression this frequency swings as low as 150,000 hertz. This frequency range is a very large span of useful output, and can provide high resolution and high accuracy in many force sensing applications.

A pair of silicon sensors 130 can advantageously be used in a silicon accelerometer 160 shown in FIG. 8. The silicon accelerometer 160 is constructed of four crystalline silicon plates or layers 162, 164, 166 and 168. The outer layers 162 and 168 act as cover layers and may be of identical geometric construction with respect to one another. The middle layers 164 and 166 are mass/suspension/beam layers and also may be of identical geometric construction with respect to one another. Anisotropic etching may be employed to form the recesses, the suspension flexures, and the seismic mass in the cover layers 162 and 168 and in the m/s/b layers 164 and 166, as shown, before the layers 162, 164, 166, and 168 are assembled to form the accelerometer 160.

As viewed in FIG. 8, each of the layers 162–168 has an upper surface, i.e. a first surface, and a lower surface, i.e. a second surface. The first surface of the m/s/b layer 166 and the second surface of the m/s/b layer 164 may be etched or otherwise suitably processed to provide cooperating recesses 170 and 172 which are arranged to form a cavity 174 when the m/s/b layers 164 and 166 are assembled as shown in FIG. 8. Similarly, the first surface of the m/s/b layer 166 and the second surface of the m/s/b layer 164 may be etched or otherwise suitably processed to provide cooperating recesses 176 and 178 which are arranged to form a cavity 180. The cover layer 162 is provided with recesses 182 and 184 and a travel limit stop 186, and the cover layer 168 is provided with recesses 188 and 190 and a travel limit stop 191.

Sufficient silicon material remains in the second surface of the m/s/b layer 166 after formation of the recesses 170 and 176 to form flexure members 192 and 194, respectively. Similarly, sufficient silicon material remains in the first surface of the m/s/b layer 164 after formation of the recesses 172 and 178 to form flexure members 196 and 198, respectively. A first silicon sensor 130, including a silicon beam 132, a drive capacitor 141, a piezoelectric resistor 148, and a cover 146, is provided in a region 200 of the flexure member 192 of the same construction as the silicon sensor 130 shown in FIGS. 5–7. Thus, the flexure member 192 is the same as the flexure member 134 of the silicon sensor 130 of FIGS. 5–7. Similarly, a second silicon sensor 130, including a silicon beam 132, a drive capacitor 141, a piezoelectric resistor 148, and a cover 146, is provided in a region 202 of the flexure member 198 of the same construction as the silicon sensor 130 shown in FIGS. 5–7. Thus, the flexure member 198 is also the same as the flexure member 134 of the silicon sensor 130 of FIGS. 5–7.

A terminal pad 204 is provided on the second surface of the m/s/b layer 166 and suitable circuit paths on the second surface of the m/s/b layer 166 connect the terminal pad 204 to the drive capacitor 141 and the piezoelectric resistor 148 provided in the region 200 of the m/s/b layer 166. A similar terminal pad 206 is provided on the first surface of the m/s/b layer 164 and suitable circuit paths on the first surface of the m/s/b layer 164 connect the terminal pad 206 to the drive capacitor 141 and piezoelectric resistor 148 provided in the region 202 of the m/s/b layer 164. As will be discussed below, the terminal pads 204 and 206 provide the means for connecting the piezoelectric resistors 148 and the drive capacitors 141 in the regions 200 and 202 to respective oscillator amplifiers.

When the m/s/b layers are assembled as shown in FIG. 8, the recesses 170 and 176 in the m/s/b layer 166 and the recesses 172 and 178 in the m/s/b layer 164 form a seismic mass 208 between the cavities 174 and 180. The accelerometer 160 is assembled by bonding the layers 162, 164, 166 and 168 together using silicon dioxide/silicon thermoelectric bonds. As the accelerometer 160 experiences acceleration, the seismic mass 208 bends the flexure members 192 and 198 so that one of the silicon beams 132 in the regions 200 and 202 is on the outside surface of its corresponding flexure member and so that the other of the silicon beams 132 in the regions 200 and 202 is on the inside surface of its corresponding flexure member. Thus, one silicon beam 132 is in tension and the other silicon beam 132 is in compression. For example, if the accelerometer 160 is accelerated in the upward direction as viewed in FIG. 8, the seismic mass 208 bends the flexure member 192 so that the silicon beam 132 in the region 200 is on the inside surface of the curvature of the flexure member 192 and is, accordingly, in compression, and the seismic mass 208 bends the flexure member 198 so that the silicon beam 132 in the region 202 is on the outside surface of the curvature of the flexure member 198 and is, accordingly, in tension. Thus, the resonant frequencies of the silicon beams 132 in the regions 200 and 202 are decreased and increased, respectively. This differential change in the vibration frequencies may be sensed to provide an indication of the amount and direction of the acceleration.

The cavities 174 and 180, together with the recesses 182, 184, 188, and 190, may be filled with a damping gas in order to damp movement of the seismic mass 208 and to thereby decrease the sensitivity of the accelerometer 160 to vibration. Although many gases may be used for the damping gas in the cavities 174 and 180 and the recesses 182, 184, 188, and 190, it is preferable that the gas be inert and thermally conductive. The vacuum chambers 136 of the silicon sensors 130 in the regions 200 and 202, i.e. the vacuum chambers within which the silicon beams 132 vibrate, ensure a high Q for the accelerometer 160. Preferably, the cavities 174 and 180 and the recesses 182, 184, 188 and 190 are in gas communication with one another through suitable holes (not shown in FIG. 8) in the flexure members 192, 194, 196, and 198. The seismic mass 208 may move between the cover layers 162 and 168 but the extent of movement of the seismic mass 208 is limited by the travel limit stops 186 and 191, respectively.

Although the accelerometer 160 may be an elongated device having separate cavities 174 and 180, the accelerometer 160 is preferably a quadrilateral device. Accordingly, although only the top view of one of the layers 162, 164, 166, and 168 is shown in FIG. 9 (i.e. the m/s/b layer 164), it is understood that the other layers 162, 166 and 168 have the same quadrilateral shape. The first m/s/b layer 164 as shown in FIGS. 9 has two recesses 220 and 222 joining the recesses 174 and 178 to form one continuous recess 224. The continuous recess 224 is etched as a closed path in the second surface 226 of the first m/s/b layer 164. This etching results in a mesa 228 surrounded by the continuous recess 224. A similar mesa 230 (FIG. 8) is formed in the m/s/b layer 166. When the m/s/b layers 164 and 166 are assembled together as shown in FIG. 8 (such as by bonding a ridge 232 around an outside perimeter of the layer 164 to a ridge 234 around an outside perimeter of the layer 166), the mesa 228 in the m/s/b layer 164 and the corresponding mesa 230 in the m/s/b layer 166 form the seismic mass 208 shown in FIG. 8.

Holes 236 may be provided from the continuous recess 224 through a first surface 238 of the m/s/b layer 164 in order to provide for communication between the continuous recess 224 and the recesses 182 and 184 in the cover layer 162. Holes similar to the holes 236 may also be provided from the similar continuous recess in the m/s/b layer 166 through a first surface thereof in order to provide for communication between that continuous recess and the recesses 188 and 190 in the cover layer 168. Since the cover layers 162 and 168 are also quadrilateral, the recesses 182 and 184 form a continuous quadrilateral recess in the second surface of the cover layer 162, and the recesses 188 and 190 form a continuous quadrilateral recess in the first surface of the cover layer 168. Thus, the cavities 174 and 180, the recesses 182, 184, 188, and 190, and the holes 236 form one continuous gas chamber for containing a damping gas to damp movement of the seismic mass 208 and the flexure members 192 and 198.

The terminal pad 206 may be provided on the m/s/b layer 164 having terminals 240, 242, 244 and 246 for connection to the drive capacitor 141 and piezoelectric resistor 148 of the region 202 on the surface 238 of the m/s/b layer 164. The region 250 shown in FIG. 9 represents the drive capacitor 141/piezoelectric resistor 148 region of the silicon beam 132 in the region 202 on the m/s/b layer 164. The terminal 240 of the terminal pad 206 is connected to one electrode of a two electrode drive capacitor 141, and the terminal 246 is connected to the other electrode of the drive capacitor 141 (it being understood that an additional terminal in the terminal pad 206 is required if the drive capacitor 141 includes a third electrode). The terminal 242 is connected to the terminal 150 of the piezoelectric resistor 148 in the region 202 on the m/s/b layer 164, and the terminal 244 is connected to the terminal 152 of this piezoelectric resistor 148. Similar terminals of the terminal pad 204 on the m/s/b layer 166 are connected to the drive capacitor 141 and the piezoelectric resistor 148 in the region 200 on the m/s/b layer 166.

Figure 11:
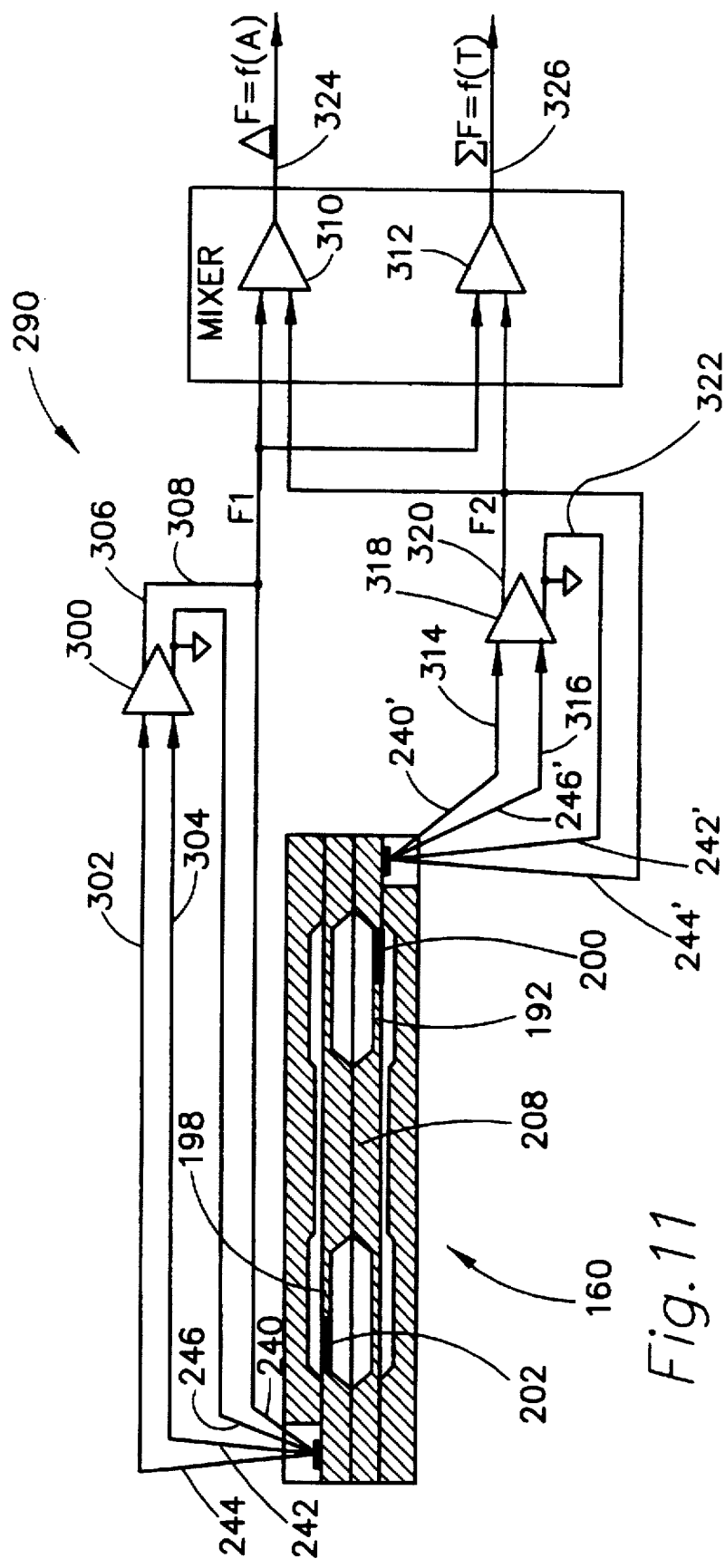
FIG. 11 shows a circuit arrangement for driving the vibrating silicon beams of the accelerometer shown in FIG. 8 and for detecting the vibration frequency thereof.

An oscillator amplifier circuit 290 is connected to the accelerometer 160 as shown in FIG. 11 in order to drive the silicon beams 132 in the regions 200 and 202 into vibration and to sense the resonant frequency of these silicon beams 132. This oscillator amplifier circuit 290 includes an oscillator amplifier 300 having its inputs 302 and 304 connected to the piezoelectric resistor 148 of the region 202 by way of the terminals 242 and 244. A first output 306 from the oscillator amplifier 300 is connected to one electrode of the drive capacitor 141 formed in the region 202 by way of the terminal 240. A second output 308 from the oscillator amplifier 300 is connected to ground and also to the other electrode of the drive capacitor 141 in the region 202 by way of the terminal 246. The output 306 from the amplifier 300 is also connected to a first input of an amplifier 310 and may be connected to a first input of an amplifier 312.

Similarly, the oscillator amplifier circuit 290 also includes an oscillator amplifier 318 having its inputs 314 and 316 connected to the piezoelectric resistor 148 of the region 200 by way of the terminals 242' and 244'. A first output 320 from the oscillator amplifier 318 is connected to one electrode of the drive capacitor 141 formed in the region 200 by way of the terminal 240'. A second output 322 from the oscillator amplifier 318 is connected to ground and also to the other electrode of the drive capacitor 141 in the region 200 by way of the terminal 246'. The output 322 from the amplifier 318 is also connected to a second input of the amplifier 310 and may be connected to a second input of the amplifier 312.

During resonance of the silicon beam 132 in the region 202 of the accelerometer 160, the oscillator amplifier 300 supplies alternating current to the drive capacitor 141 in the region 202 to vibrate the silicon beam 132 in this region at its resonant frequency. This frequency is sensed by the piezoelectric resistor 148 in the region 202 which provides an input to the oscillator amplifier 300 in order to maintain resonant vibration of the silicon beam 132 in the region 202. Similarly, during resonance of the silicon beam 132 in the region 200 of the accelerometer 160, the oscillator amplifier 318 supplies alternating current to the drive capacitor 141 in the region 200 to vibrate the silicon beam 132 in this region at its resonant frequency. This frequency is sensed by the piezoelectric resistor 148 in the region 200 which provides an input to the oscillator amplifier 318 in order to maintain resonant vibration of the silicon beam 132 in the region 200.

As the accelerometer 160 experiences acceleration, the seismic mass 208 bends the flexure members 192 and 198 to place one of the silicon beams 132 in the regions 200 and 202 in tension and the other of the silicon beams 132 in the regions 200 and 202 in compression. The resonant frequency of one of the silicon beams 132 in the regions 200 and 202 increases, and the resonant frequency of the other of the silicon beams 132 in the regions 200 and 202 decreases. Accordingly, the output frequency from one of the oscillator amplifiers 300 and 318 increases and the output frequency from the other of the oscillator amplifiers 300 and 318 decreases. The outputs 306 and 308, and 320 and 322, respectively from the oscillator amplifiers 300 and 318 are fed back to their respective drive capacitors 141 in the regions 200 and 202 to sustain the new resonant frequencies of the silicon beams 132. This process maintains the resonant vibration frequencies of the silicon beams 132 in the regions 200 and 202 during changes in acceleration experienced by the accelerometer 160.

Thus, the output frequencies from the oscillator amplifiers 300 and 318 change in opposite directions with one increasing and the other decreasing. The amplifier 310 provides an output 324 which is a function of the difference between the output frequencies from the oscillator amplifiers 300 and 318. Thus, the output 324 from the amplifier 310 indicates the amount of acceleration which produced this difference between the output frequencies from the oscillator amplifiers 300 and 318. The polarity of the frequency change in the output 324 of the amplifier 310 indicates the direction of acceleration. The amplifier 312 provides an output 326 frequency which is a function of the sum of the output frequencies from the oscillator amplifiers 300 and 318. The output 326 from the amplifier 312 can provide an indication of temperature and other factors which influence the vibration frequencies of the silicon beams 132 in the regions 200 and 202 and, if desired, can be used for compensation.

The construction of the accelerometer 160 uses cost effective photolithographic techniques common to the silicon industry and results in an essentially monolithic structure. The performance of the accelerometer 160 is enhanced because the resonant beam structure, i.e. the vibrating beams 132, are sealed in their own vacuum compartments. Thus, any interference between the resonant beam Q and the use of a damping gas for the seismic mass 208 and the flexure members 192 and 198 is avoided. The accelerometer 160 is very sensitive along its input axis 210 while providing a stiff suspension along the directions perpendicular to the input axis 210. The arrangement of the accelerometer 160 provides for common mode rejection in that environmental influences negate one another by the use of dual vibrating silicon beams. Also, the arrangement shown in FIG. 8, and in particular the geometry shown in FIG. 9, can accommodate multiple pairs of silicon beams 132. Thus, a silicon beam 130 can be placed on each side of the four sided structure shown in FIG. 9. Such an arrangement can provide for redundancy in the event of failure. The temperature range of the device is limited only by the active electronics and is not limited by accelerometer itself since the use of polysilicon avoids the need to form pn junctions in the doped areas.

Figure 12:
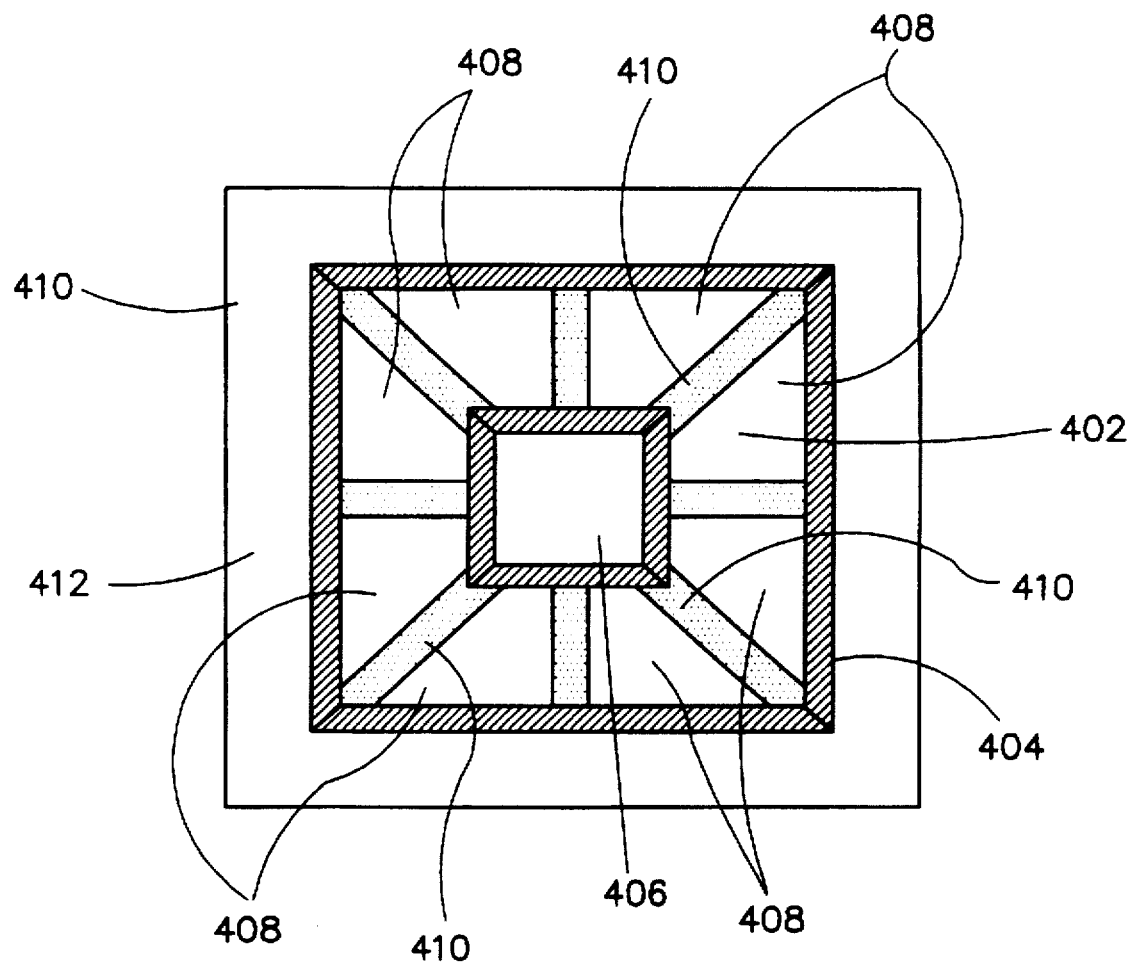
FIG. 12 shows an alternate m/s/b layer for an accelerometer according to the present invention; and, FIG. 13 shows still another alternate m/s/b layer for an accelerometer according to the present invention.

An alternate m/s/b layer 400 is shown in FIG. 12. This m/s/b layer 400 may be used in place of the m/s/b layers 164 and 166 shown in FIGS. 8 and 9. The m/s/b layer 400 has a quadrilateral continuous recess 402. The continuous recess 402 is etched as a closed path in a surface 404 of the m/s/b layer 400. This etching results in a mesa 406 surrounded by the continuous recess 402. As in the case of the m/s/b layers 164 and 166 of FIGS. 8 and 9, the mesa 406 in the m/s/b layer 400 forms a seismic mass with a corresponding mesa in a corresponding second m/s/b layer.

As shown in FIG. 12, the continuous recess 402 is selectively etched entirely through the m/s/b layer 400 in multiple areas 408 to leave webs 410 physically attaching and supporting the mesa 406 to a ridge 412 around the perimeter of the m/s/b layer 400. As in the case of the holes 236 in the m/s/b/ layer 164, the areas 408 provide for gas communication through the continuous recess 402. Opposing ones of the webs 410 act as flexure members similar to the flexure member 134 of FIG. 5. Silicon sensors may thus be formed in these opposing webs. The size of webs 410 can be controlled to in turn control the amount of stiffness with which the mesa 406 is supported and the stiffness of the flexure member formed by the webs 410 of the m/s/b layer 400. Accordingly, the sensitivity of the accelerometer can be increased while at the same time the mass of the accelerometer is reduced.

Figure 13:
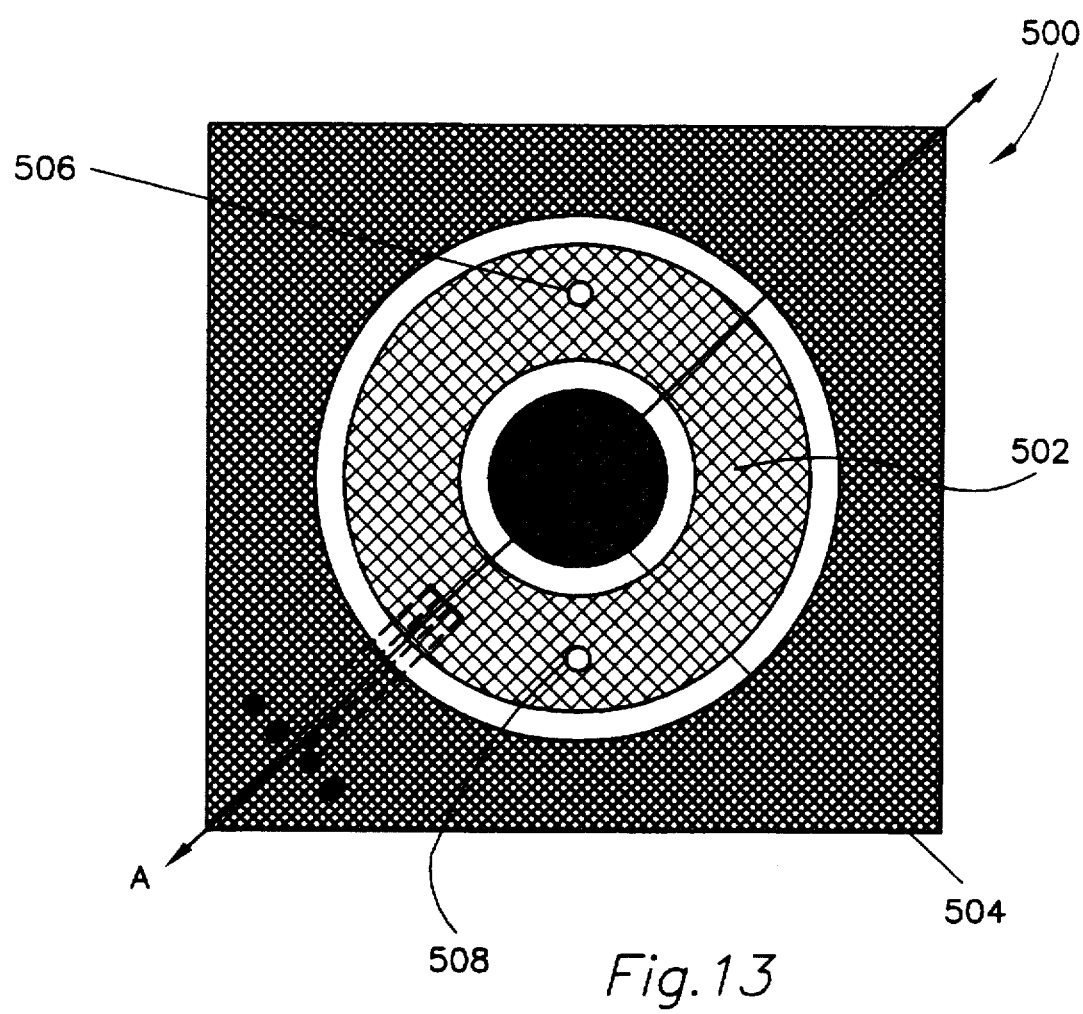

A further alternate m/s/b layer 500 is shown in FIG. 13. The m/s/b layer 500 has a circular continuous recess 502. Whereas a quadrilateral recess may be formed by anisotropic etching, the circular recess 502 is formed by isotropic etching. This etching of the recess 502 results in a circular mesa 504 surrounded by the continuous recess 502. As in the case of the m/s/b layers 164 and 166 of FIGS. 8 and 9, the mesa 504 in the m/s/b layer 500 forms a seismic mass with a corresponding mesa in a corresponding second m/s/b layer. This second m/s/b layer may be formed having the same geometry as the m/s/b layer 500. Two additional layers, similar to the outer layers 162 and 168 shown in FIG. 8, may also be formed, but with circular geometry to match the circular geometry of the m/s/b layer 500. As in the case of the holes 236 in the m/s/b/ layer 164, gas holes 506 and 508 may be provided.

Figure 14A:
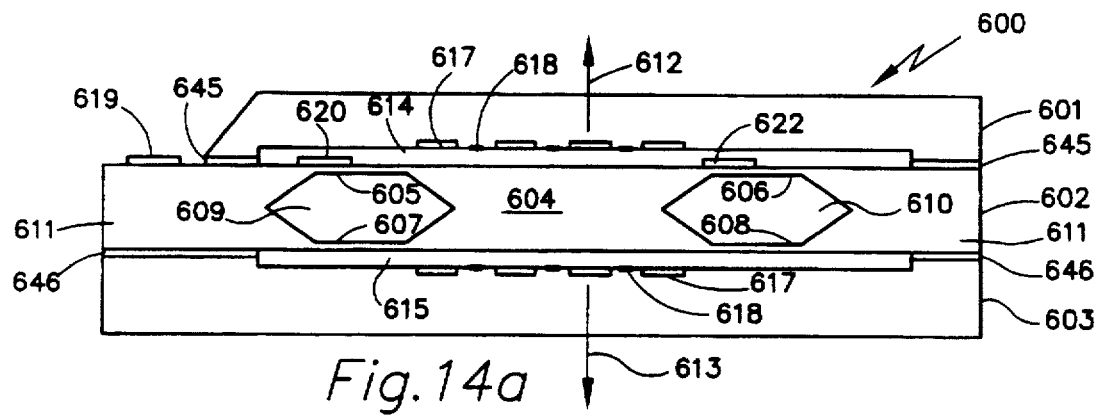
FIGS. 14a–c reveal various three wafer resonant microbeam accelerometers.
Figure 15:
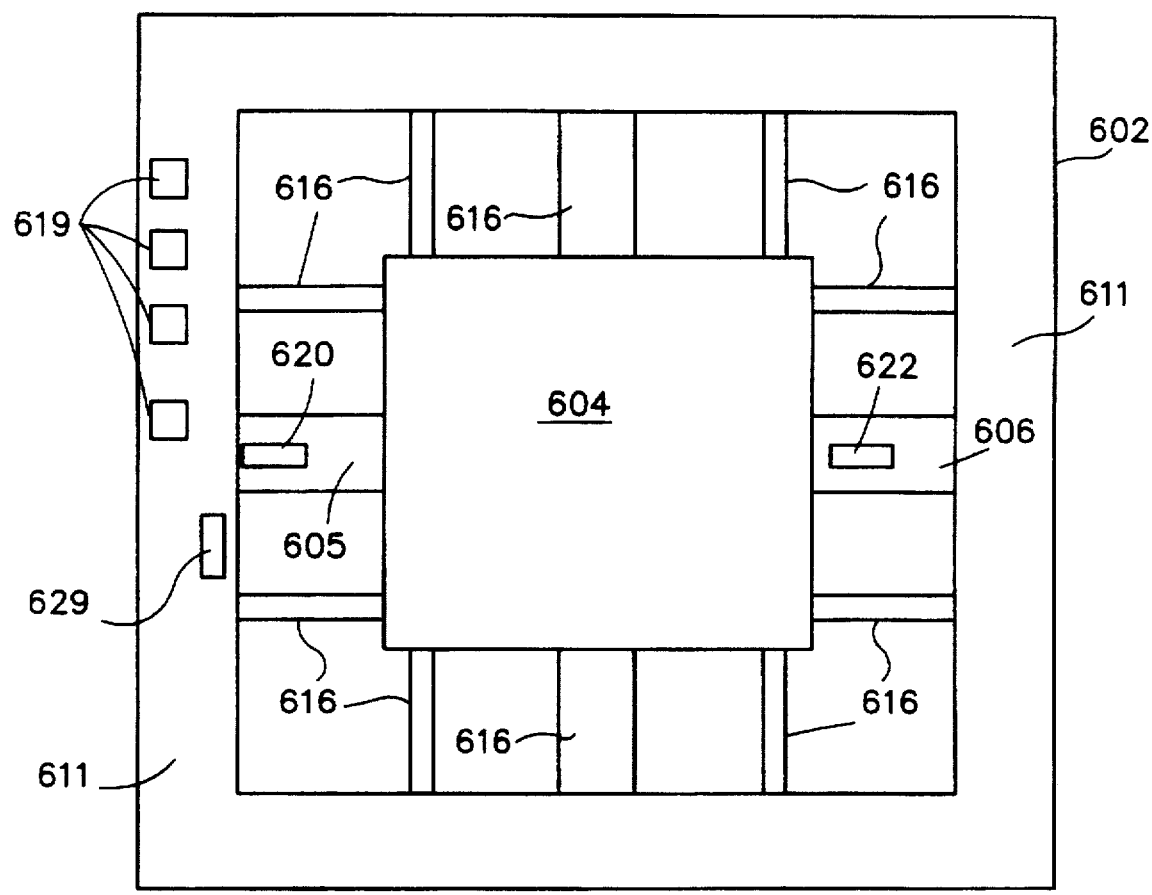
FIG. 15 is a plan view of the middle layer, including the proof mass, of a resonant microbeam accelerometer.

FIG. 14a shows a configuration 600 having only three silicon wafers or layers 601, 602 and 603. FIG. 15 is a top view of second layer 602. Wafer 602 is recessed at volumes 609 and 610 to form a proof mass or an acceleration responsive mass 604 supported by flexure members 605, 606, 607 and 608 to supportive structure 611. Other supporting flexure members 616 are show in FIG. 15. When subject to acceleration in directions 612 and 613, mass 604 moves towards layer 601 or 603, respectively. Recesses 614 and 615 permit movement of mass 604.

Recesses 614 and 615 have damping channels 617 and dimples 618 for damping. Layers 601 and 603 can be used to seal the chamber that the proof mass is in for purposes of containing a damping gas or maintaining a vacuum. Layers 601 and 603 also provide for overrange and environmental protection.

Silicon resonant beam sensors 620 and 622 incorporate silicon or polysilicon beams 131 and 132, respectively, and associated sensing and drive elements as noted above. Pads 619 provide for external connections to sensors 620 and 622. Sensors 620 and 622 in FIG. 14a are placed on flexure members 605 and 606, respectively. Location of sensors 620 and 622 on flexure members is significant. Sensor 620 is placed on flexure member 605 closer to supportive structure 611 than to proof mass 604. On the other hand, sensor 622 is placed on flexure member 606 closer to proof mass 604 than to supportive structure 616. When proof mass moves in direction 612, beam 131 of sensor 620 is in compression and beam 132 of sensor 622 is in tension thereby resulting in resonant beam frequencies that are indicative of the respective compression and tension. These frequencies reveal the amount of movement of mass 604 towards wafer 601 and consequently the amount and direction of acceleration force exerted on device 600. When proof mass moves in direction 613, beam 131 of sensor 620 is in tension and beam 132 of sensor 622 is in compression thereby resulting in resonant beam frequencies that are indicative of the respective tension and compression. A resonant beam frequency increases with tension and decreases with compression. The frequencies reveal the amount of movement of 604 into recess 614 or 615 and consequently the amount and direction of acceleration force exerted on device 600.

Figure 14B:
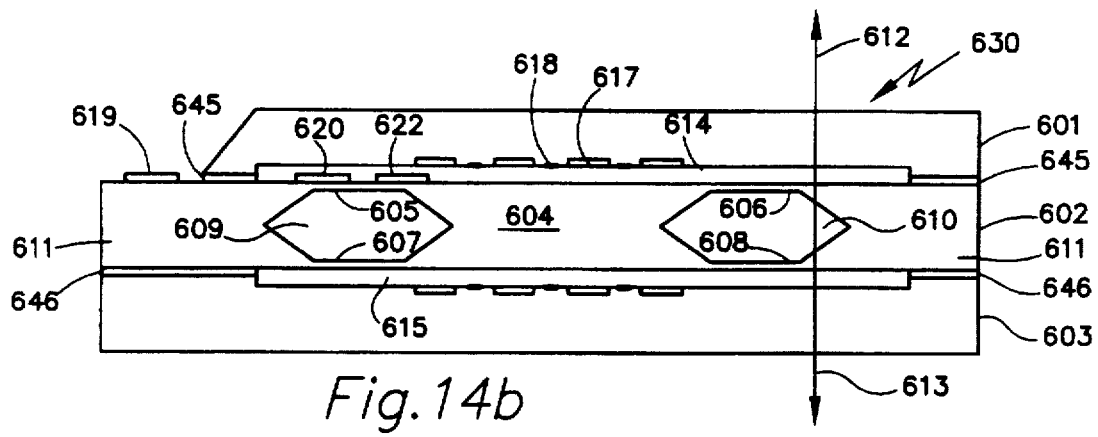

FIG. 14b shows configuration 630 regarding placement of sensor 622. Sensor 620 remains in the same location on flexure member 605, as in configuration 600. Sensor 622 is also located on flexure member 605 but closer to proof mass 604 than to supportive structure or frame 611. Sensor 622 is in tension while sensor 620 is in compression and vice versa, in the same manner as device or configuration 600 of FIG. 14a, for respective proof mass 604 displacements, when device 630 is subject to an acceleration force in direction 612 or 613, respectively. Devices 600 and 630 are insensitive to and do not measure acceleration forces in directions perpendicular to directions 612 and 613.

Figure 14C:
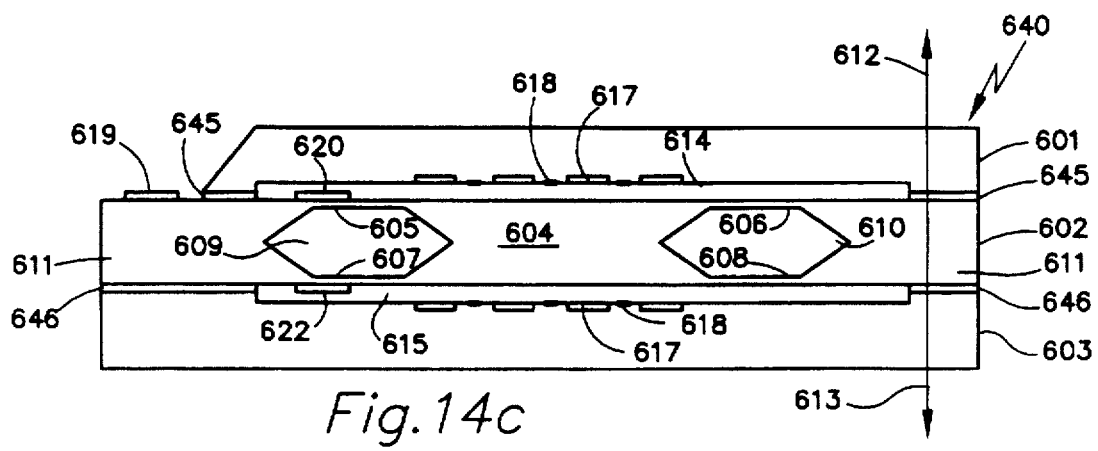

FIG. 14c shows configuration of device 640. Device 640 is similar to devices 600 and 630 except for a different placement of sensor 622 which is situated on flexure 607 at a position closer to supportive structure or frame 611 than to proof mass 604. Sensor 620 is in tension while sensor 622 is in compression and vice versa, in the same manner as device or configuration 600 of FIG. 14a, for respective proof mass 604 displacements when device 640 is subject to an acceleration force in direction 612 or 613, respectively.

FIG. 15 is a top view of device 600 of FIG. 14a. Top views of devices 630 and 640 are the same except for the different locations of sensor 622 as noted in FIGS. 14b and 14c. Proof mass 604 is supported by flexure members 616 in addition to flexure members 605 and 606, which are connected to structure 611, at the top surface of layer 602. Additional flexure members, besides members 607 and 608, support mass 604 at the bottom surface of layer 602. Pads 619 provide for external connections to sensors 620 and 622, and to layers 601, 602 and 603, as needed, such as in the electrostatic force rebalance design of FIG. 17. FIG. 15 also shows a microbeam sensor 629 which provides a signal indicative of the temperature of layer 602 for compensating sensors 620 and 622 to reduce or eliminate temperature-related sensing deviations.

Figure 16A:
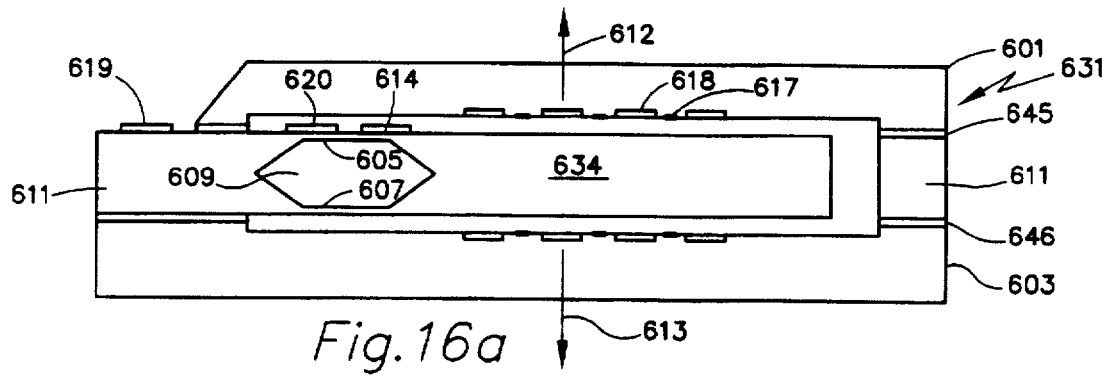
FIGS. 16a–d shows several pendulous accelerometers.
Figure 16B:
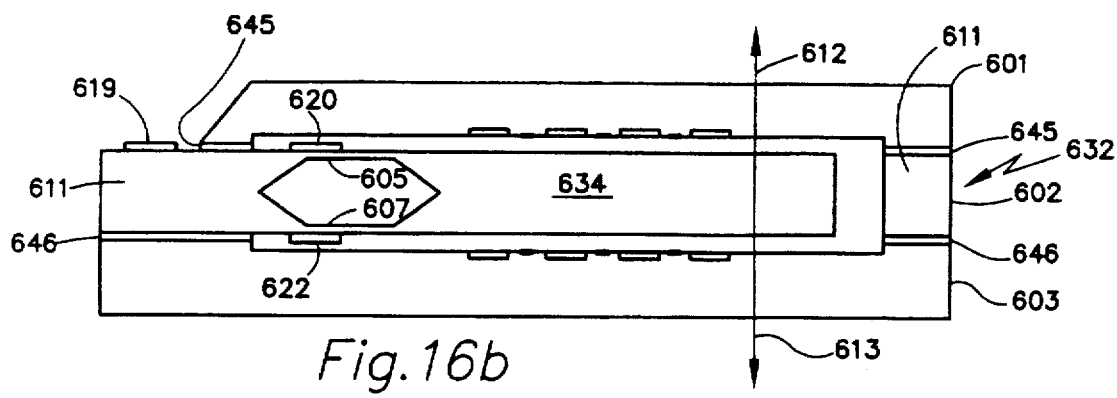
Figure 16C:
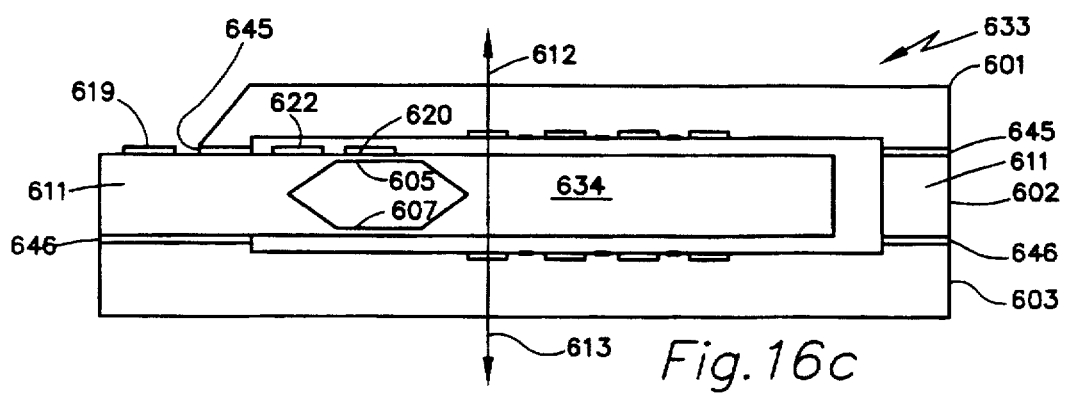
Figure 16D:
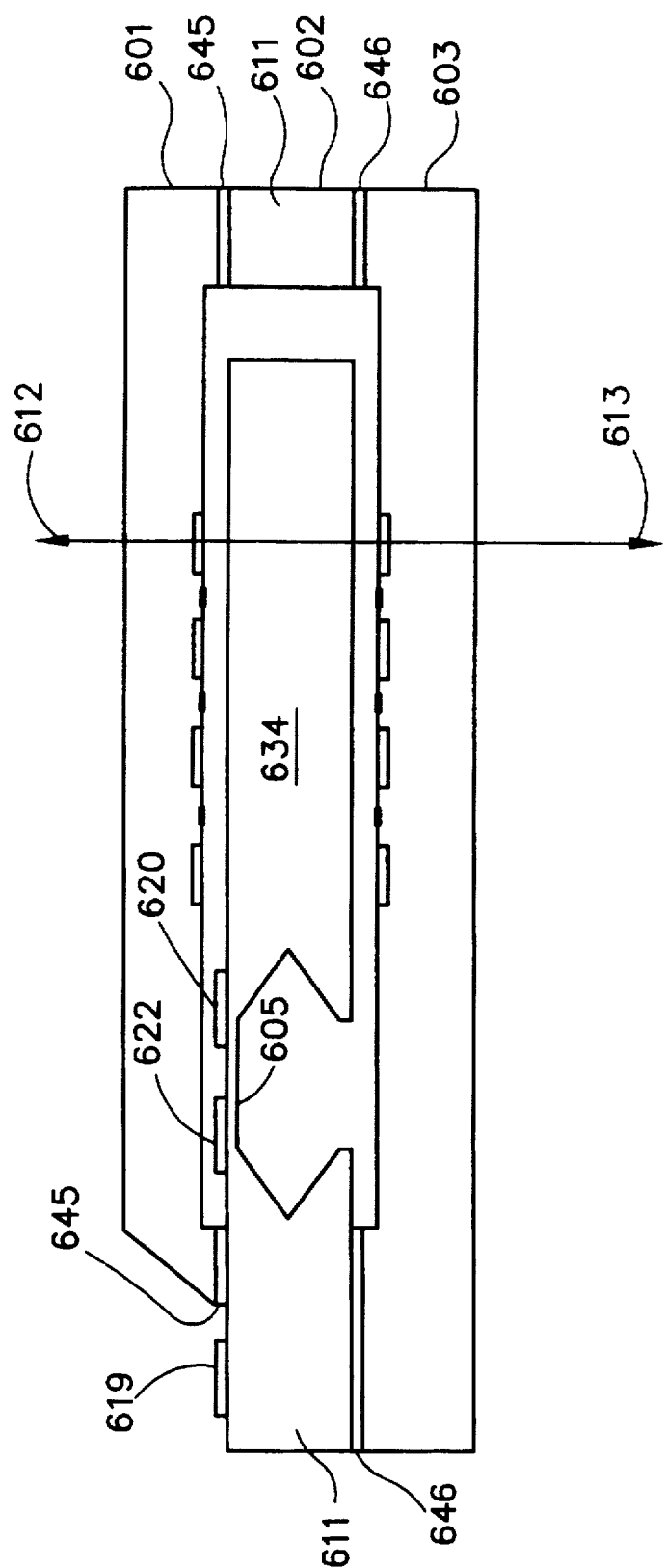

FIGS. 16a, 16b, 16c and 16d reveal configurations or devices 631, 632 and 633 of a pendulous microbeam sensor accelerometer design. Acceleration responsive mass or proof mass 634 swings on flexure members 605 and 607 which function like supportive hinges for mass 634. Mass 634 swings on just flexure 605 as shown in FIG. 16d. Mass 634 stays equidistant from wafers 601 and 603 unless subjected to an acceleration force in direction 612 or 613.

In device 631 of FIG. 16a, sensor 620 is placed on flexure 605 at a location closer to supportive structure 611 than to proof mass 634, and sensor 622 is placed on flexure 605 at a location closer to proof mass 634 than to supportive structure 611. When an acceleration force acts on proof mass 634 in direction 612, sensor 620 has microbeam 131 in compression and sensor 622 has microbeam 132 in compression. Microbeam 131 is like microbeam 132. When an acceleration force acts on proof mass 634 in direction 613, sensors 620 and 622 have beams 131 and 132, respectively, in tension. Compression and tension affect the resonant frequencies of beams 131 and 132. The resonant frequencies are indicative of the magnitude and direction of the affecting acceleration force on proof mass 634.

Configuration or device 632 has sensor 620 placed on flexure member 605 and situated closer to supportive structure 611 than to proof mass 634, and sensor 622 on flexure member 607 and situated closer to supportive member 611 than to proof mass 622. When device 632 is subject to an acceleration force in direction 612 or 613, sensor 620 is in compression while sensor 622 is in tension, and vice versa, respectively, with determination of magnitude and direction of the acceleration force made from the resulting changes of resonant beam frequencies.

Configuration or device 633 has sensor 620 placed on flexure member 605 and sensor 622 on supportive structure or frame 611. Sensor 622 is not affected by an acceleration force but is by temperature and may be used for temperature compensation of sensor 620. When device 633 is subject to an acceleration force in direction 612 or 613, resonant beam 131 is under compression or tension, respectively, and has a resonant frequency indicative of the compression or tension and, in turn, of the magnitude and direction of the acceleration force.

Figure 17:
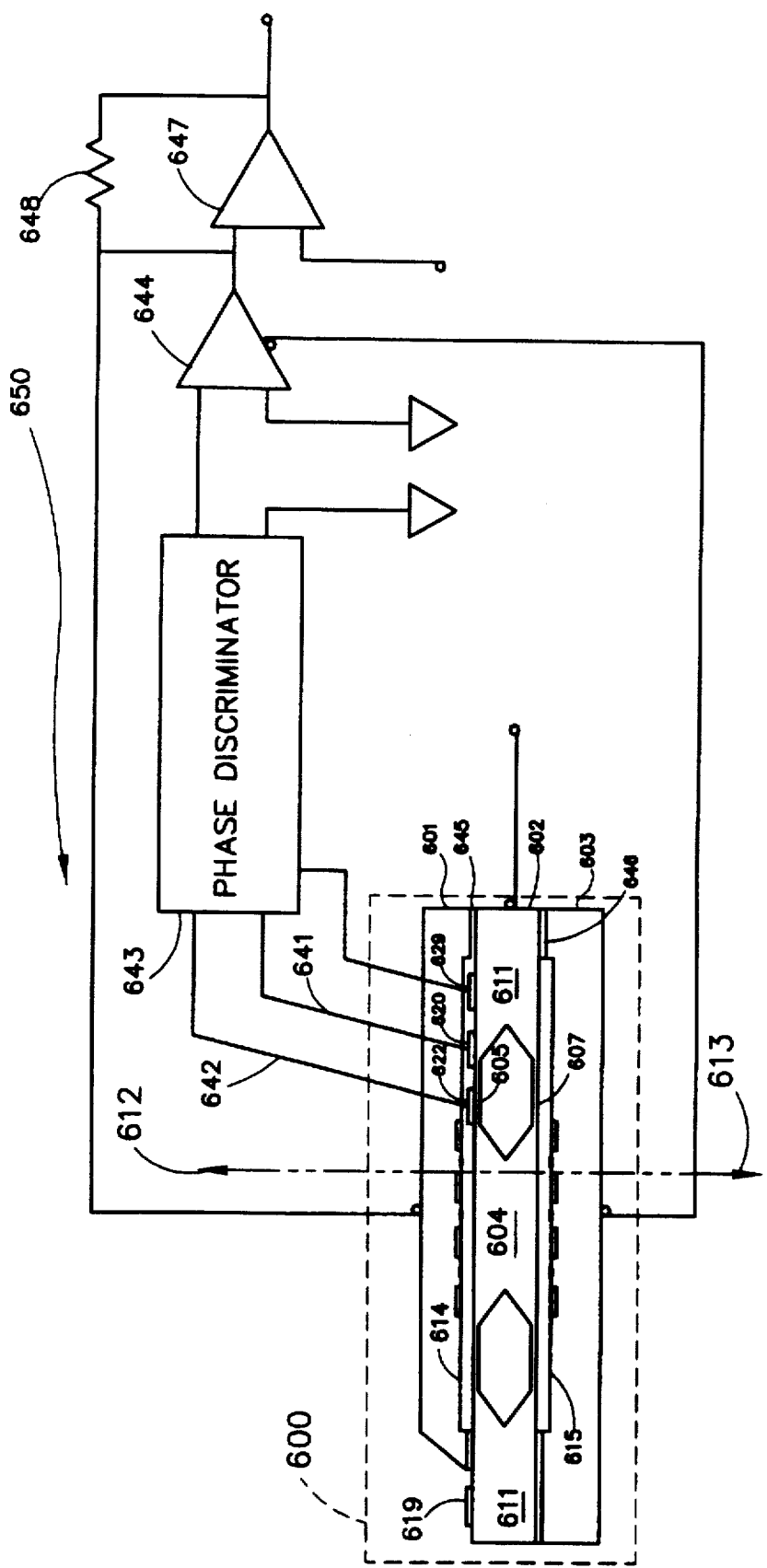
FIG. 17 is a diagram of electrostatic rebalance electronics for a resonant microbeam accelerometer.

FIG. 17 is a diagram of electronics 650 for a electrostatic force rebalance resonant beam sensor system. Resonant beam sensors 620 and 622 are on flexure member 605 of device 600. With no accelerational force, the resonant frequencies from sensors 620 and 622 are about the same, and have a particular value for no force and the frequencies have a particular phase relationship. Accelerational force in direction 612 causes beam 131 of sensor 620 to be in compression and beam 132 of sensor 622 to be in tension. Thus, the resonant frequency of sensor 620 decreases as the resonant frequency of sensor 622 increases. Signals 641 and 642, representing resonant frequencies of sensors 620 and 622, respectively, go to phase discriminator 643 which detects the changes in the relative phases of the resonant frequencies and indicates whether the proof mass 604 is moving towards recess 614 of layer 601, or moving towards recess 615 of layer 603. An output indicating a change of phase relationship between the resonant frequencies of sensors 620 and 622, goes from phase discriminator 643 to amplifier 644. The outputs of amplifier 644 go to layers 601 and 602, respectively. Layer 602 is connected to a reference voltage. Pairs of layers 601 and 602, and 602 and 603, form electrodes for two capacitors between the layers. Layers 645 and 646 insulate layers 601 and 603 from layer 602. The outputs of amplifier 644 to device 600 cause an electrostatic force to be present in the device to force back or rebalance proof mass 604 to its original mid-position of equilibrium as if no accelerational force were acting on mass 604. The amount of voltages required at the outputs of amplifier 644 to rebalance proof mass 604 indicates the amount and direction of accelerational force, perpendicular (i.e., direction 612 or 613) to the plane of the surfaces of layers 601, 602 and 603. One output of amplifier 644 goes to the inverting input of amplifier 647. Resistor 648 provides negative feedback to and determines the gain of amplifier 647 to provide a particular scale factor at the output of amplifier 647, which results in a signal capable of providing an accurate indication of the acceleration force acing on proof mass 604. A voltage is provided at the non-inverting input of amplifier 647 for bias adjustment.

Since variations can be made with respect to the invention without departing from the scope of the invention, the scope of the invention is to be limited only by the claims.

We claim:

1. A sensor comprising:

a supporting frame having an opening therein;

a mass disposed in the opening and moveable in directions approximately parallel to a first axis; and wherein:

the first axis is perpendicular to a plane parallel to the perimeter of said supporting frame; and a second axis is parallel to the plane;

a flexure coupled between the frame and the mass; and wherein:

said flexure supports said mass relative to said supporting frame;

said flexure bends a first way upon movement of said mass in a first direction approximately parallel to the first axis; and said flexure bends a second way upon movement of said mass in a second direction approximately parallel to the first axis; and a vibratory beam formed on said flexure; and wherein:

said vibratory beam is stretched in a direction approximately parallel to the second axis when said flexure bends the first way;

said vibratory beam is compressed in a direction approximately parallel to the second axis when said flexure bends the second way;

said vibratory beam has a resonant frequency;

the resonant frequency changes when said vibratory beam is stretched;

the resonant frequency changes when said vibratory beam is compressed; and the resonant frequency is indicative of a magnitude and direction of acceleration affecting said mass in a direction approximately parallel to the first axis.

2. The sensor of claim 1 wherein said sensor is constructed from at least one micromachined wafer.

3. A sensor comprising:

a supporting frame having an opening therein;

a mass disposed in the opening and moveable in directions approximately parallel to a first axis;

wherein:

the first axis is perpendicular to a plane approximately parallel to the perimeter of said supporting frame; and a second axis and a third axis are parallel to the plane;

a plurality of flexures coupled between said frame and said mass; and wherein:

said plurality of flexures support said mass relative to said supporting frame;

each flexure of a first portion of said plurality of flexures, bends a first way upon movement of said mass in a first direction approximately parallel to the first axis;

each flexure of the first portion of said plurality of flexures, bends a second way upon movement of said mass in a second direction approximately parallel to the first axis;

each flexure of a second portion of said plurality of flexures, bends a first way upon movement of said mass in a first direction approximately parallel to the first axis; and each flexure of the second portion of said plurality of flexures, bends a second way upon movement of said mass in a second direction approximately parallel to the first axis;

a first vibratory beam formed on each flexure of the first portion of said plurality of flexures; and wherein:

said first vibratory beam is stretched in a direction approximately parallel to a plane containing the second and third axes, when said first portion flexure bends the first way;

said first vibratory beam is compressed in a direction approximately parallel to the plane containing the second and third axes, when said first portion flexure bends the second way;

said first vibratory beam has a first resonant frequency;

the first resonant frequency increases when said first vibratory beam is stretched; and the first resonant frequency decreases when said first vibratory beam is compressed; and a second vibratory beam formed on each flexure of the second portion of said plurality of flexures; and wherein:

said second vibratory beam is compressed in a direction approximately parallel to the plane containing the second and third axes, when said second portion flexure bends the first way;

said second vibratory beam is stretched in a direction approximately parallel to the plane containing the second and third axes, when said second portion flexure bends the second way;

said second vibratory beam has a second resonant frequency;

the second resonant frequency changes when said second vibratory beam is stretched; and the second resonant frequency changes when said second vibratory beam is compressed; and the first and second resonant frequencies are indicative of a magnitude and direction of an acceleration force affecting said mass in a direction approximately parallel to the first axis.

4. The sensor of claim 3 wherein said sensor is constructed from at least one micromachined wafer.

5. An accelerometer comprising:

a first wafer having a thickness, having a first surface, having a second surface approximately parallel to and at a distance equal to the thickness from the first surface, having a recess formed in said first wafer resulting in a proof mass having first and second surfaces, surrounded by a perimeter support structure having first and second surfaces, the proof mass supported by a first plurality of flexures connected to the perimeter support structure and to the proof mass at the first surface of said first wafer, and the proof mass supported by a second plurality of flexures connected to the perimeter support structure and to the proof mass at the second surface of said first wafer, the first and second pluralities of flexures formed from said first wafer;

a resonant vibratory microbeam formed on at least one flexure of the first plurality of flexures;

a first insulating layer situated next to the first surface of the perimeter support structure;

a second insulating layer situated next to the second surface of the perimeter support structure;

a second wafer, formed over the first surface of said first wafer and situated next to said first insulating layer, having a recess for permitting movement of the proof mass;

a third wafer, formed under the second surface of said first wafer and situated next to said second insulating layer, having a recess for permitting movement of the proof mass;

a sensing means, proximate to said resonant vibratory microbeam, for detecting a vibration of said resonant vibratory microbeam; and a force rebalance circuit connected to said first wafer, said second wafer, said third wafer and to said sensing means; and wherein:

the proof mass is moveable in first and second directions perpendicular to a plane parallel to the first surface of said first wafer;

the proof mass moves in the first direction when said accelerometer is subject to an acceleration force in the first direction, the proof mass moves in the second direction when said accelerometer is subject to an acceleration force in the second direction, and the proof mass is situated in a null position when not subject to an acceleration force;

said force rebalance circuit provides an electrostatic force on the proof mass, which has a magnitude equal to a magnitude of an acceleration force simultaneously affecting the proof mass, the electrostatic force having a direction opposite of that of the acceleration force, and the electrostatic force maintaining the proof mass in the null position;

an amount of distance that the proof mass moves is proportional to a difference of the magnitudes of the acceleration and electrostatic forces;

an amount of bending of the at least one flexure is proportional to the amount of distance that the proof mass moves;

said resonant vibratory microbeam has a resonant frequency that increases when the proof mass moves in the first direction and decreases when the proof mass moves in the second direction, wherein a variation of the resonant frequency is due to a change of length of said resonant vibratory microbeam which in turn is due to a bending of the at least one flexure;

said first and second wafers form electrodes of a first capacitor and said first and third wafers form electrodes of a second capacitor, such that a first signal on the electrodes of the first capacitor provides an electrostatic force to attract the proof mass towards said second wafer and a second signal on the electrodes of the second capacitor provides an electrostatic force to attract the proof mass towards said third wafer;

the resonant frequency of said resonant vibratory microbeam is at a first frequency when the magnitude of the acceleration force is zero, is initially slightly greater than the first frequency when the magnitude of the acceleration force is greater than zero in the first direction, and is initially slightly less than the first frequency when the magnitude of the acceleration force is greater than zero in the second direction; and said force rebalance circuit provides first and second signals to the electrodes of the first and second capacitors, respectively, for maintaining the proof mass in the null position, the first and second signals indicative of magnitude and direction of the acceleration force in the first and second direction.

6. The accelerometer of claim 5 further comprising a temperature sensor, formed on the perimeter support structure and connected to said force rebalance circuit, wherein said temperature sensor comprises a resonant vibratory microbeam having a variable resonant frequency indicative of temperature, and for sending a temperature-indicative signal to said force rebalance circuit to compensate for temperature-related error in the first and second signals indicative of magnitude and direction of the acceleration force.

7. A sensor comprising:

a supporting frame having an opening therein;

a mass disposed in the opening and moveable in directions approximately parallel to a first axis; and wherein:
the first axis is perpendicular to a plane parallel to the perimeter of said supporting frame; and
a second axis is parallel to the plane;

at least one flexure coupled between the frame and the mass; and wherein:
said flexure supports said mass relative to said supporting frame;
said flexure bends a first way upon movement of said mass in a first direction approximately parallel to the first axis; and
said flexure bends a second way upon movement of said mass in a second direction approximately parallel to the first axis; and a vibratory beam formed on said flexure; and wherein:
said vibratory beam is stretched in a direction approximately parallel to the second axis when said flexure bends the first way;
said vibratory beam is compressed in a direction approximately parallel to the second axis when said flexure bends the second way;
said vibratory beam has a resonant frequency; the resonant frequency changes when said vibratory beam is stretched;
the resonant frequency changes when said vibratory beam is compressed; and
the resonant frequency is indicative of a magnitude of acceleration affecting said mass in a direction approximately parallel to the first axis.

8. A sensor comprising:

first, second, and third layers, each layer having first and second surfaces wherein all of the first and second surfaces said first, second and third layers are approximately parallel to one another;

said second layer fabricated to form an acceleration responsive mass, a supportive structure, a first plurality of flexure members at the first surface of said second layer and a second plurality of flexure members at the second surface of said second layer, wherein the first and second pluralities of flexure members support the acceleration responsive mass relative to the supportive structure, and the acceleration responsive mass is moveable relative to the supportive structure, along an axis approximately perpendicular to the first and second surfaces of said first, second and third layers;

said first layer having the second surface proximate to the first surface of said second layer, and having a first recess formed in the second surface of said first layer to permit movement of the acceleration responsive mass along the axis towards said first layer;

said third layer having the first surface proximate to the second surface of said second layer, and having a second recess formed in the first surface of said third layer to permit movement of the acceleration responsive mass along the axis towards said third layer;

first means, situated on a first flexure member of the first plurality of flexure members, for sensing bending of the first flexure member of the first plurality of flexure members; and wherein:
the acceleration responsive mass, when affected by an acceleration force that is in a direction parallel to the axis, results in a bending of the first flexure member of the first plurality of flexure members at an amount indicative of an amount of the acceleration force;
said first means for sensing, formed on the first flexure member of the first plurality of flexure members, comprises a vibratory beam, having a first variable resonant frequency that is indicative of an amount of bending of the first flexure member of the first plurality of flexure members and that the bending subjects the vibratory beam to compression or tension and thus results in a change of the first variable resonant frequency; and
the first resonant frequency is indicative of the amount of acceleration force affecting the acceleration responsive mass in the direction parallel to the axis.

9. The accelerometer of claim 8 further comprising:

second means, situated on a first flexure member of the second plurality of flexure members, for sensing bending of the first flexure member of the second plurality of flexure members; and wherein:
said second means for sensing, formed on the first flexure member of the second plurality of flexure members, comprises a vibratory beam, having a second variable resonant frequency that is indicative of an amount of bending of the first flexure member of the second plurality of flexure members and that the bending subjects the vibratory beam to compression or tension and thus results in a change of the second variable resonant frequency; and
the second resonant frequency is indicative of acceleration force affecting the acceleration responsive mass in the direction parallel to the member axis.

10. The accelerometer of claim 9 wherein:

said first means for sensing is situated on the first flexure member of the first plurality of flexure members, closer to said supportive structure than to said acceleration responsive mass;

said second means for sensing is situated on the first flexure member of the second plurality of flexure members, closer to said supportive structure than to said acceleration responsive mass; and the first flexure member of the first plurality of flexure members and the first flexure member of the second plurality of flexure members, are located next to each other.

11. The accelerometer of claim 10 further comprising third means for sensing temperature, formed on the supportive structure, wherein said third means for sensing comprises a vibratory beam, having a third variable resonant frequency that is indicative of the temperature on the supportive structure, for compensating errors of said first and second means for sensing due to temperature.

12. The accelerometer of claim 11 wherein said first, second and third layers are micromachined silicon.

13. The accelerometer of claim 8 further comprising:

second means, situated on a second flexure member of the first plurality of flexure members, for sensing bending of the second flexure member of the first plurality of flexure members; and wherein:
said second means for sensing comprises a vibratory beam, having a second variable resonant frequency that is indicative of an amount of bending of the second flexure member of the first plurality of flexure members, formed on the second flexure member of the first plurality of flexure members; and the first and second resonant frequencies are indicative of the amount of the acceleration force affecting the acceleration responsive mass.

14. The accelerometer of claim 13 wherein:

said first means for sensing is situated closer to said supportive structure than to said acceleration responsive mass;

the second means for sensing is situated closer to said acceleration responsive mass than to said supportive structure; and the first flexure member and the second flexure member of the first plurality of flexure members, are located diametrically opposite from each other relative to said acceleration responsive mass.

15. The accelerometer of claim 14 further comprising third means for sensing temperature, formed on the supportive structure, wherein said third means for sensing comprises a vibratory beam having a third variable resonant frequency that is indicative of the temperature on the supportive structure, for providing information for compensating errors of said first and second means for sensing due to temperature.

16. The accelerometer of claim 15 wherein:

said first, second and third layers are micromachined silicon; and the vibratory beams of said first, second and third means for sensing are first, second and third silicon vibratory beams, respectively.

17. The accelerometer of claim 16 wherein:

said first means for sensing further comprises first vibrating means for vibrating the first silicon vibratory beam; and said second means for sensing further comprises second vibrating means for vibrating the second silicon vibratory beam.

18. The accelerometer of claim 17 wherein:

the first vibrating means comprises a first capacitor having at least one electrode on the first silicon vibratory beam; and the second vibrating means comprises a second capacitor having at least one electrode on the second silicon vibratory beam.

19. The accelerometer of claim 18 wherein:

the at least one electrode of the first capacitor is a doped region of the first silicon vibratory beam; and the at least one electrode of the second capacitor is a doped region of the second silicon vibratory beam.

20. The accelerometer of claim 19 wherein:

the first means for sensing further comprises first vibration sensing means for sensing the vibration of the first silicon vibratory beam; and the second means for sensing further comprises second vibration sensing means for sensing vibration of the second silicon vibratory beam.

21. The accelerometer of claim 20 wherein:

the first means for sensing further comprises a first amplifier having an input coupled to the first vibration sensing means and an output coupled to the first capacitor, the first amplifier being arranged for controlling the first capacitor to vibrate the first silicon vibratory beam at a resonant frequency dependent upon the first vibration sensing means; and the second means for sensing further comprises a second amplifier having an input coupled to the second vibration sensing means and an output coupled to the second capacitor, the second amplifier being arranged for controlling the second capacitor to vibrate the second silicon vibratory beam at a resonant frequency dependent upon the second vibration sensing means.

22. The accelerometer of claim 21 wherein:

the first means for sensing further comprises a first vacuum chamber surrounding the first silicon vibratory beam; and the second means for sensing further comprises a second vacuum chamber surrounding the second silicon vibratory beam.

23. The accelerometer of claim 22 wherein the accelerometer comprises a chamber that includes first and second recesses of first and third layers, respectively, and any volume proximate to the first and second pluralities of flexure members, and a third recess in said second layer about the acceleration responsive mass.

24. The accelerometer of claim 23 wherein:

said chamber contains a gas to dampen movement of the acceleration responsive mass and the first and second pluralities of flexure members; and the first and second silicon vibratory beams are in a vacuum, free of the gas thereby permitting the first and second silicon vibratory beams to vibrate with a high Q.

25. The accelerometer of claim 17 wherein:

the first vibrating means comprises a first piezoelectric device; and the second vibrating means comprises a second piezoelectric device.

26. The accelerometer of claim 25 wherein:

the first means for sensing further comprises first vibration sensing means for sensing vibration of the first silicon vibratory beam;

the second means for sensing further comprises second vibration sensing means for sensing vibration of the second silicon vibratory beam.

27. The accelerometer of claim 26 wherein:

the first means for sensing further comprises a first amplifier having an input coupled to the first vibration sensing means and an output coupled to the first piezoelectric device, the first amplifier being arranged for controlling the first piezoelectric device to vibrate the first silicon vibratory beam at a resonant frequency dependent upon the first vibration sensing means; and the second means for sensing further comprises a second amplifier having an input coupled to the second vibration sensing means and an output coupled to the second piezoelectric device, the second amplifier being arranged for controlling the second piezoelectric device to vibrate the second silicon vibratory beam at a resonant frequency dependent upon the second vibration sensing means.

28. The accelerometer of claim 27 wherein:

the first vibration sensing means is a third piezoelectric device; and the second vibration sensing means is a fourth piezoelectric device.

* * * * *